US012175077B2

(12) United States Patent
Nishikubo et al.

(10) Patent No.: US 12,175,077 B2
(45) Date of Patent: Dec. 24, 2024

(54) SEMICONDUCTOR STORAGE DEVICE

(71) Applicant: Kioxia Corporation, Tokyo (JP)

(72) Inventors: Ryuji Nishikubo, Tsurugashima (JP); Norio Aoyama, Machida (JP)

(73) Assignee: Kioxia Corporation, Tokyo (JP)

( * ) Notice: Subject to any disclaimer, the term of this patent is extended or adjusted under 35 U.S.C. 154(b) by 162 days.

(21) Appl. No.: 17/806,815

(22) Filed: Jun. 14, 2022

(65) Prior Publication Data
US 2023/0315292 A1    Oct. 5, 2023

(30) Foreign Application Priority Data
Mar. 18, 2022  (JP) ................................. 2022-043759

(51) Int. Cl.
  *G06F 3/06*  (2006.01)
(52) U.S. Cl.
  CPC ............ *G06F 3/061* (2013.01); *G06F 3/0655* (2013.01); *G06F 3/0679* (2013.01)
(58) Field of Classification Search
  CPC ....... G06F 3/061; G06F 3/0655; G06F 3/0679
  See application file for complete search history.

(56) References Cited

U.S. PATENT DOCUMENTS

| 5,619,727 | A | 4/1997 | Chen et al. | |
|---|---|---|---|---|
| 6,970,978 | B1 * | 11/2005 | Wu | G06F 12/0862 |
| | | | | 711/158 |
| 2007/0081546 | A1 * | 4/2007 | Yap | H04L 12/40013 |
| | | | | 370/423 |
| 2009/0125648 | A1 * | 5/2009 | Huang | G06F 13/362 |
| | | | | 710/40 |
| 2014/0047147 | A1 * | 2/2014 | Gyobu | G06F 13/374 |
| | | | | 710/121 |
| 2019/0079698 | A1 * | 3/2019 | Lee | G06F 3/0611 |
| 2019/0121558 | A1 * | 4/2019 | Lee | G06F 3/0679 |
| 2022/0188021 | A1 * | 6/2022 | Park | G06F 3/0688 |

FOREIGN PATENT DOCUMENTS

| JP | 2004-13356 A | 1/2004 |
|---|---|---|
| JP | 2007-4271 A | 1/2007 |

OTHER PUBLICATIONS

Arm Limited (or its affiliates) "Introduction to AMBA AXI" Issue 03. 2021, (62 pages) https://developer.arm.com/documentation/102202/latest/. ievelo

* cited by examiner

*Primary Examiner* — Henry Tsai
*Assistant Examiner* — Harry Z Wang
(74) *Attorney, Agent, or Firm* — Oblon, McClelland, Maier & Neustadt, L.L.P.

(57) ABSTRACT

According to one embodiment, a semiconductor storage device includes a volatile memory, nonvolatile memory chips, channels, nonvolatile memory interfaces, and a bus arbiter. Each of the channels is connected to at least one nonvolatile memory chip of the nonvolatile memory chips. Each of the nonvolatile memory interfaces is connected to at least one channel of the channels and controls the at least one nonvolatile memory chip via the connected channel. The bus arbiter controls use of a bus in data transfer between the volatile memory and each of the nonvolatile memory chips in accordance with a bandwidth of the bus.

19 Claims, 11 Drawing Sheets

F.I.G. 1

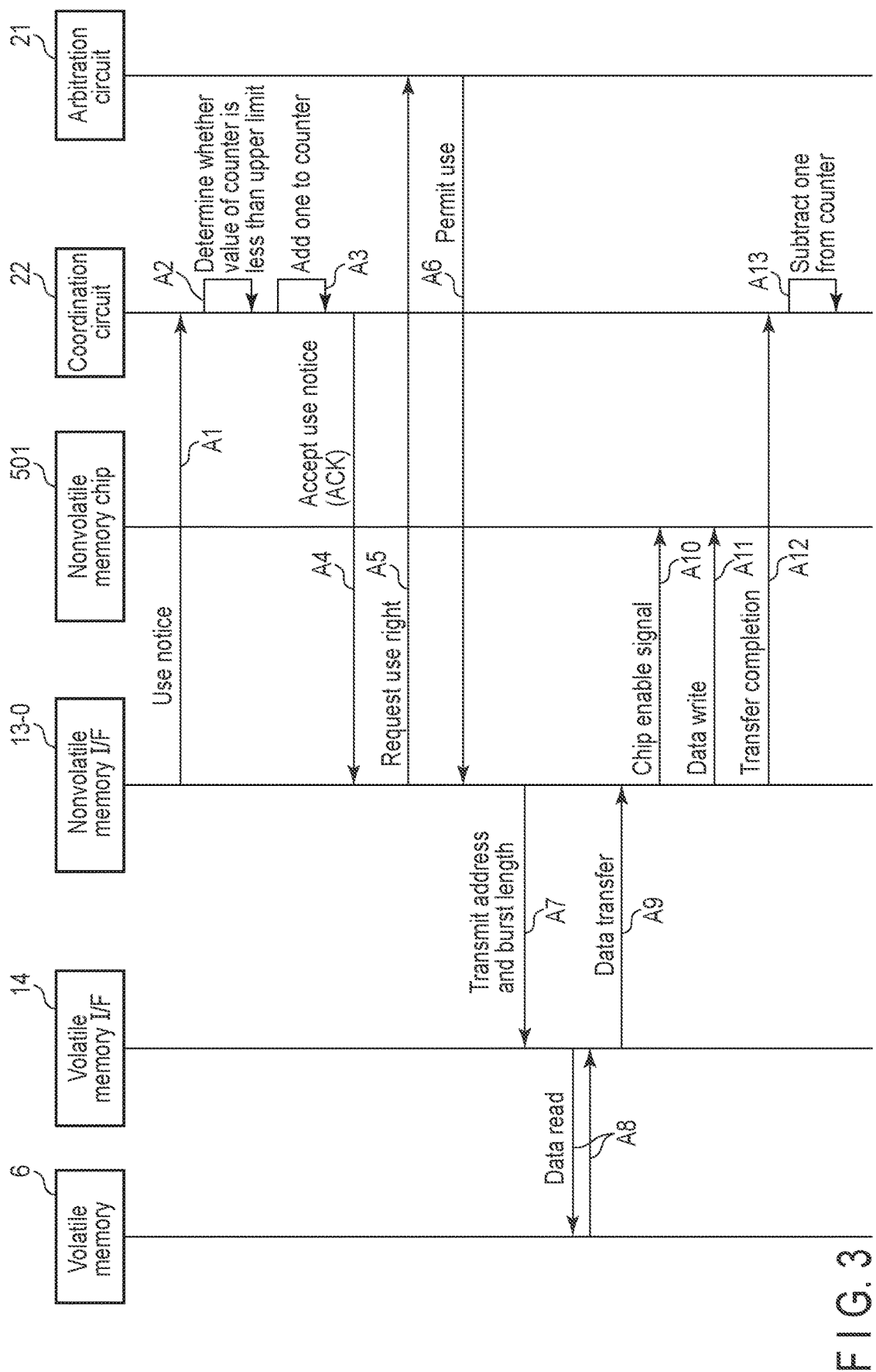
F I G. 3

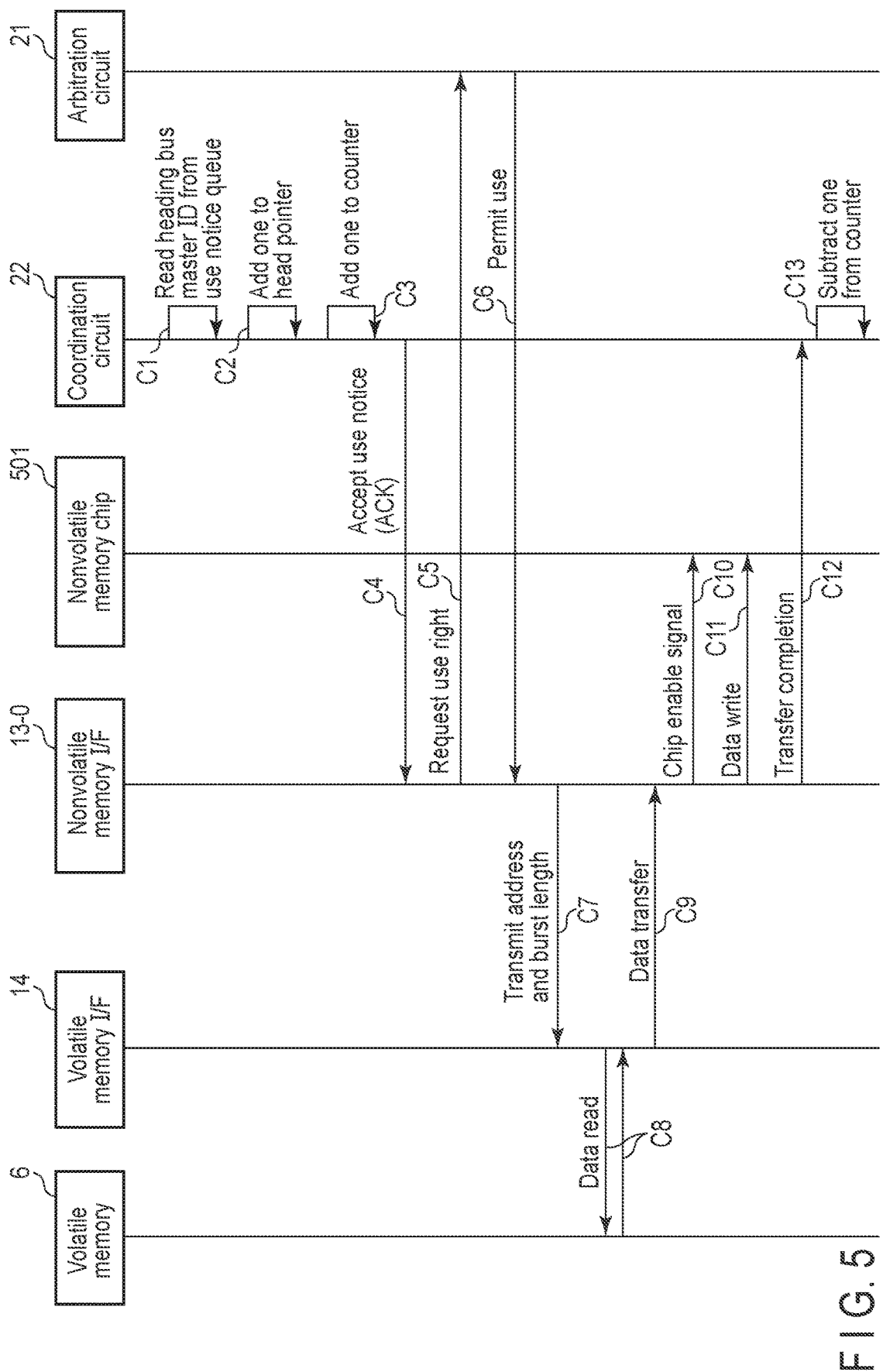
F I G. 5

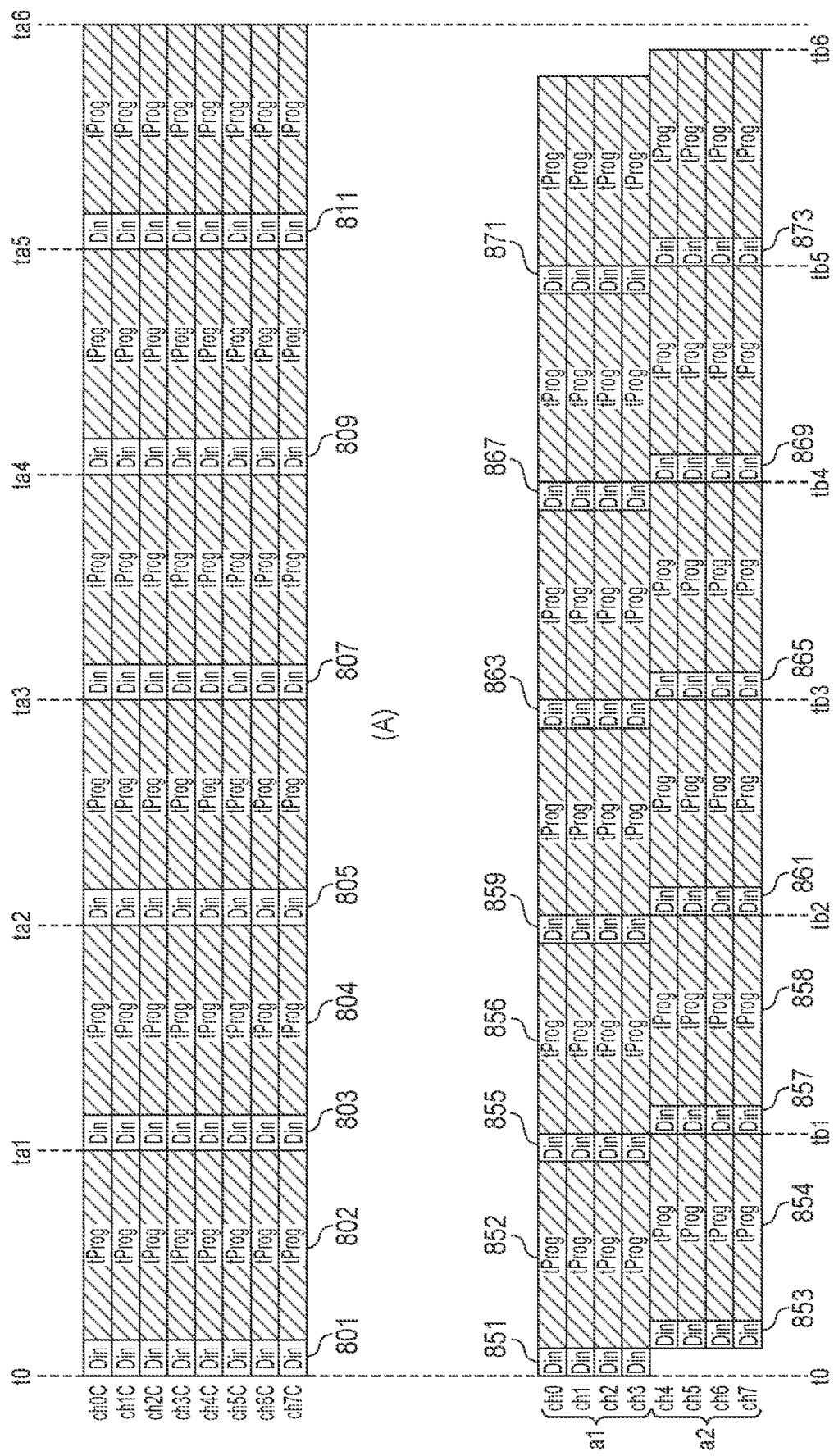
F I G. 6

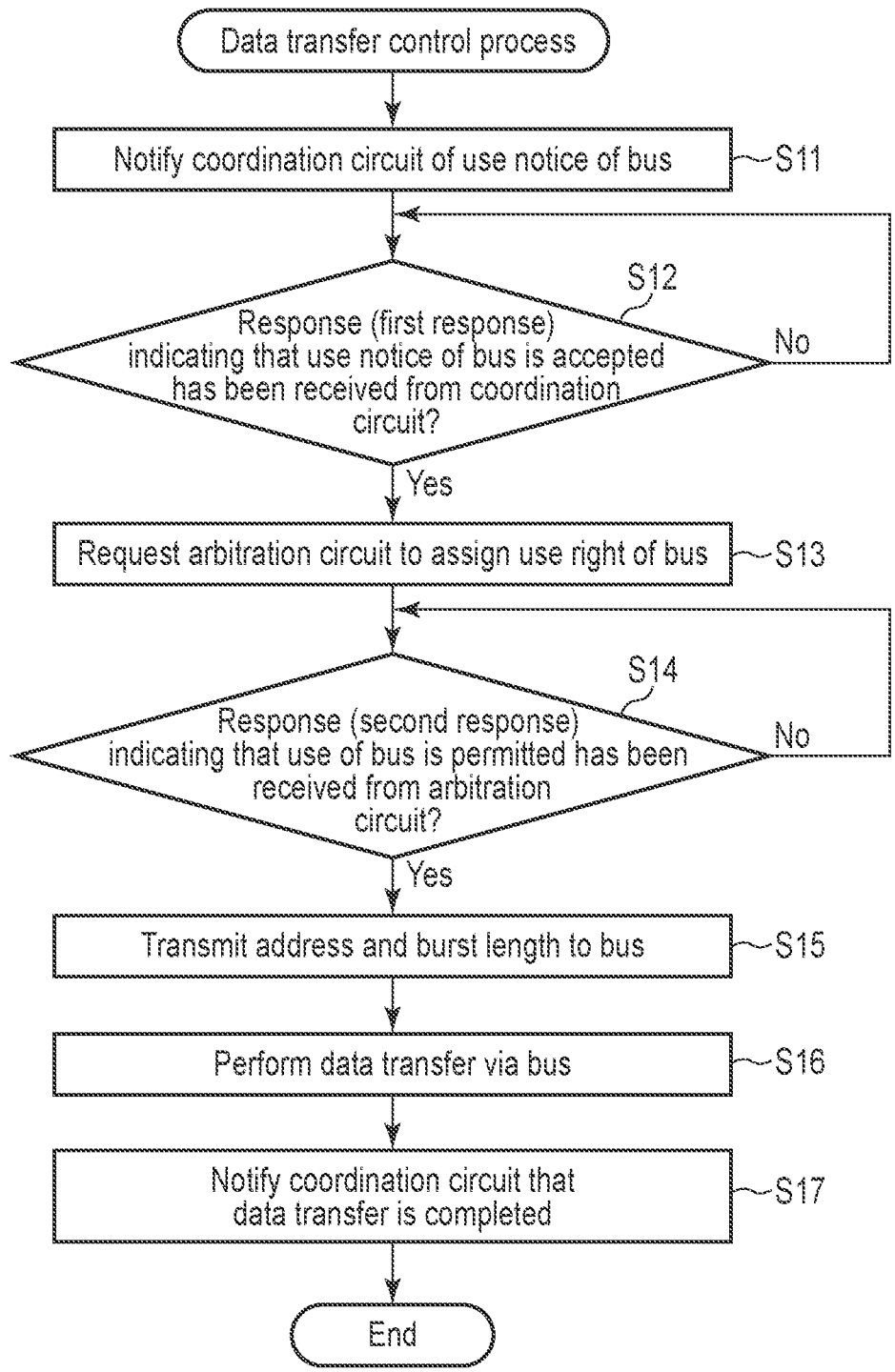
F I G. 8

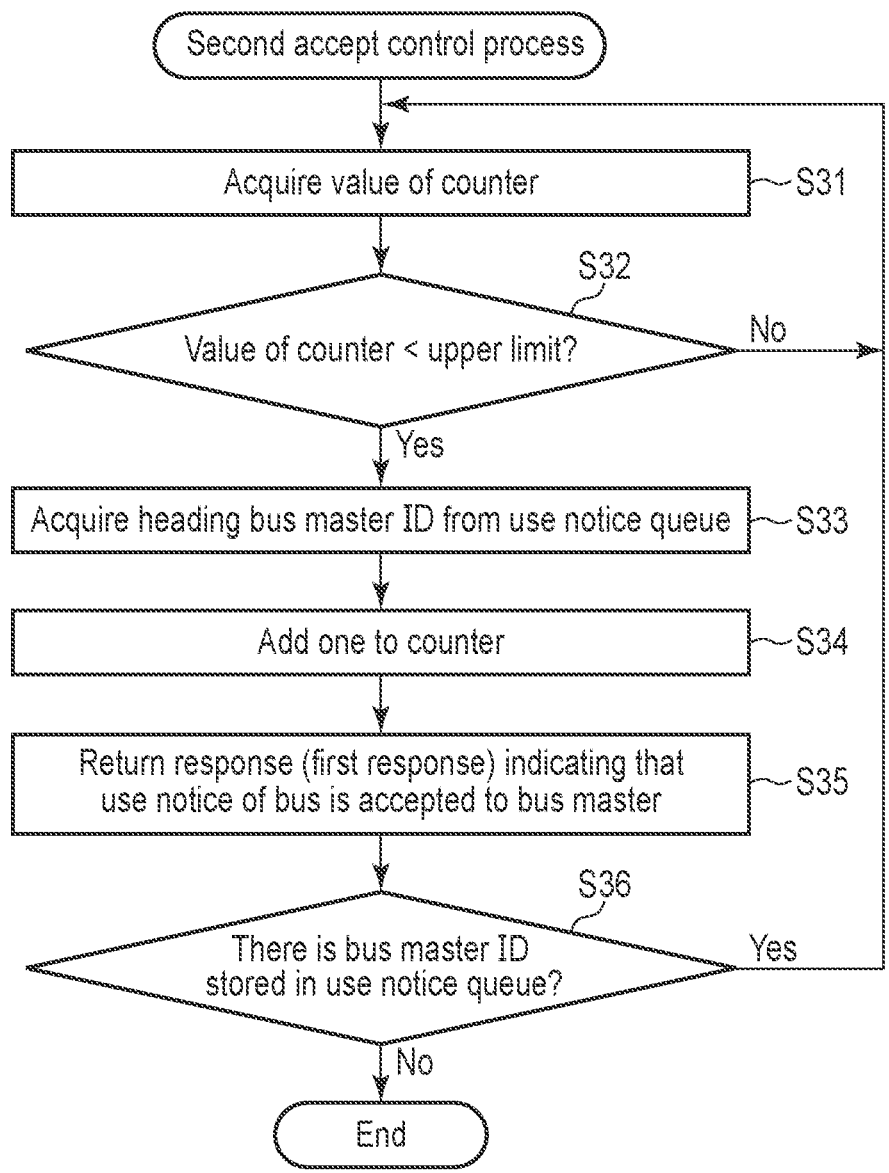
F I G. 10

SEMICONDUCTOR STORAGE DEVICE

CROSS-REFERENCE TO RELATED APPLICATIONS

This application is based upon and claims the benefit of priority from Japanese Patent Application No. 2022-043759, filed Mar. 18, 2022, the entire contents of which are incorporated herein by reference.

FIELD

Embodiments described herein relate generally to a semiconductor storage device that includes a nonvolatile memory chip.

BACKGROUND

In recent years, semiconductor storage devices including a nonvolatile memory chip are widely used. As one of such semiconductor storage devices, a solid state drive (SSD) including a NAND flash memory chip is known. The SSD is used as a main storage for various computing devices.

A semiconductor storage device may have multiple nonvolatile memory chips. Each of the nonvolatile memory chips is connected to, for example, any of multiple channels. A channel is a data transmission path. The multiple nonvolatile memory chips that are connected to the multiple channels, respectively, can perform data transfer in parallel.

The semiconductor storage device further includes a volatile memory and a bus. The volatile memory is a storage area that temporarily stores data. The bus is a data transmission path. Data is transferred between the nonvolatile memory chips and the volatile memory, via the channels and the bus.

In a case where data is transferred between the nonvolatile memory chips and the volatile memory, a transfer rate of the data may reach a bandwidth of the bus. In this case, although the nonvolatile memory chips and the volatile memory can transfer data at a higher transfer rate, the transfer rate may become slow because of the bandwidth of the bus that is a bottleneck. This possibly prolongs the time required for data transfer, as compared with a case where the transfer rate does not reach the bandwidth of the bus. The prolonged time required for data transfer may cause degraded access performance to the nonvolatile memory chips.

BRIEF DESCRIPTION OF THE DRAWINGS

FIG. 3 is a sequence diagram illustrating an example of a data write operation in the semiconductor storage device according to the embodiment.

FIG. 5 is a sequence diagram illustrating an example of an operation in the semiconductor storage device according to the embodiment in a case where the value of the counter falls below the upper limit after adding one to a tail pointer.

FIG. 6 is a diagram illustrating (A) an example of a time chart of a data write operation in which a use notice is not used and (B) an example of a time chart of a data write operation in which a use notice is used, in the semiconductor storage device according to the embodiment.

FIG. 8 is a flowchart illustrating an example of the procedure of a data transfer control process performed by a bus master in the semiconductor storage device according to the embodiment.

FIG. 10 is a flowchart illustrating an example of the procedure of a second acceptance control process performed in the coordination circuit of the semiconductor storage device according to the embodiment.

DETAILED DESCRIPTION

Various embodiments will be described hereinafter with reference to the accompanying drawings.

In general, according to one embodiment, a semiconductor storage device includes a volatile memory, nonvolatile memory chips, channels, nonvolatile memory interfaces, and a bus arbiter. Each of the channels is connected to at least one nonvolatile memory chip of the nonvolatile memory chips. Each of the nonvolatile memory interfaces is connected to at least one channel of the channels and controls the at least one nonvolatile memory chip via the connected channel. The bus arbiter controls use of a bus in data transfer between the volatile memory and each of the nonvolatile memory chips in accordance with a bandwidth of the bus.

Figure 1:
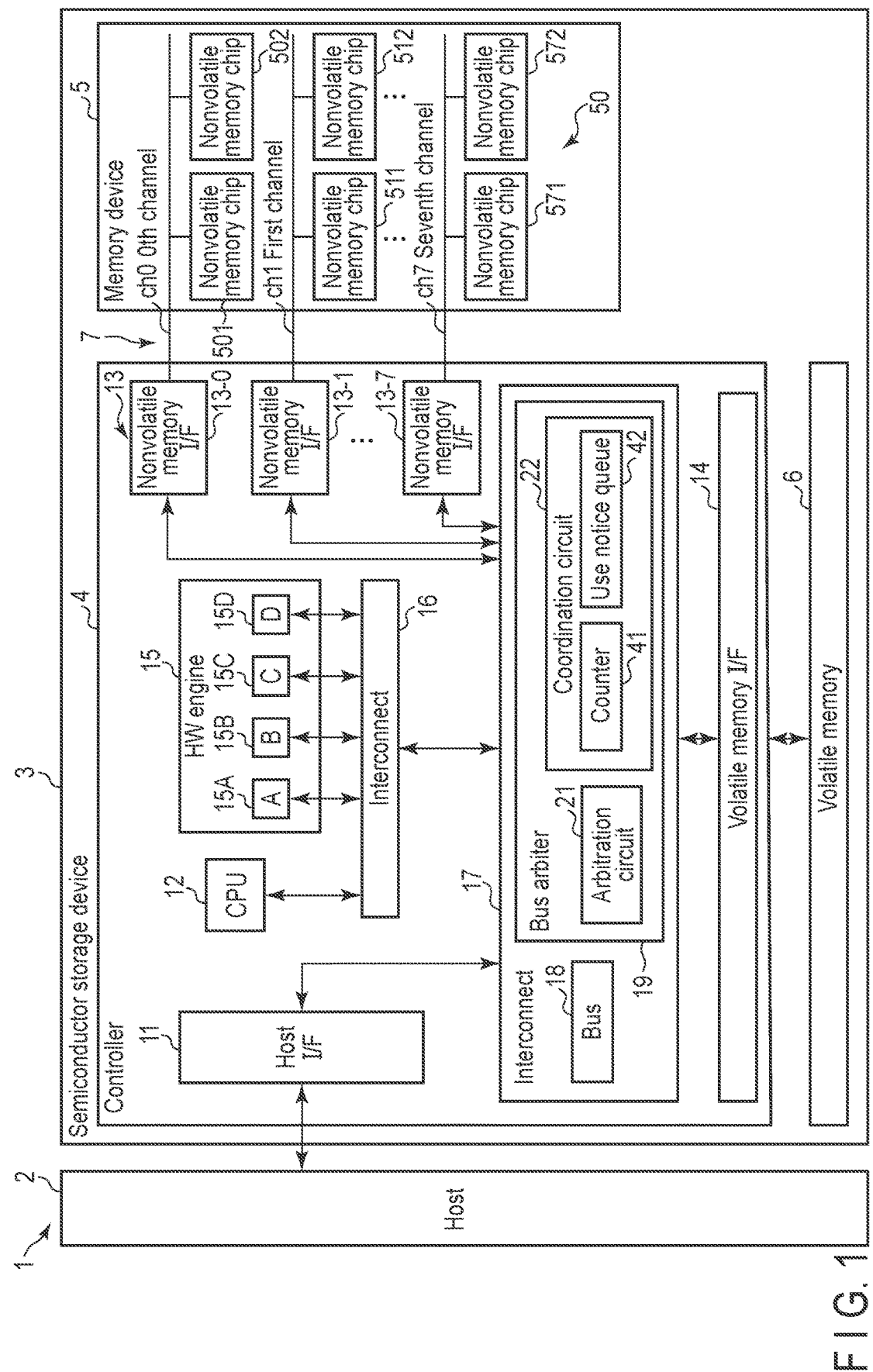
FIG. 1 is a block diagram illustrating an example of a configuration of an information processing system that includes a semiconductor storage device according to an embodiment.

FIG. 1 is a block diagram illustrating an example of a configuration of an information processing system 1 that includes a semiconductor storage device according to an embodiment. The information processing system 1 includes a host device 2 and a semiconductor storage device 3.

The host device 2 is an information processing apparatus that is external to the semiconductor storage device 3. The host device 2 is, for example, a server computer or a personal computer. Hereinafter, the host device 2 will also be referred to as a host 2.

The semiconductor storage device 3 is, for example, a solid state drive (SSD). The semiconductor storage device 3 is, for example, a hard disk drive (HDD). The semiconductor storage device 3 may function as a storage device of the host 2. The semiconductor storage device 3 is configured to write data into a memory device. The semiconductor storage device 3 is configured to read data from the memory device. The memory device is, for example, a nonvolatile memory chip. The nonvolatile memory chip is, for example, a NAND flash memory chip.

The semiconductor storage device 3 is connected to the host 2 via, for example, a cable or a network. Alternatively, the semiconductor storage device 3 may be provided inside the host 2. An interface connecting the semiconductor storage device 3 and the host 2 conforms to standards such as SCSI, Serial Attached SCSI (SAS), ATA, Serial ATA (SATA), PCI Express (PCIe™), Ethernet™, Fibre channel, or NVM Express (NVMe™).

Next, an internal configuration of the semiconductor storage device 3 will be explained. The semiconductor storage device 3 includes a memory device 5, a volatile memory 6, and a controller 4.

The memory device 5 is a device that stores data in a nonvolatile way.

The volatile memory 6 is, for example, a dynamic random access memory (DRAM) or a static random access memory (SRAM). In place of the volatile memory 6, a volatile memory may be provided inside the controller 4. A storage area of the volatile memory 6 is allocated as, for example, an area (buffer area) that stores user data, and an area that stores management information. The user data is data to be written into the memory device 5 in accordance with a write request from external, or data read from the memory device 5 in accordance with a read request from external. The management information is information used for managing data on the memory device 5.

The controller 4 is a memory controller. The controller 4 is, for example, a circuit such as a system-on-a-chip (SoC). The controller 4 controls the memory device 5 and the volatile memory 6. The controller 4 is communicably connected to the memory device 5 and to the volatile memory 6. The controller 4 executes data management and block management of the memory device 5. The data management includes management of mapping information. The mapping information indicates correspondence between a logical address and a physical address. The logical address is an address used for addressing a storage area of the semiconductor storage device 3. The logical address is, for example, a logical block address (LBA). The physical address indicates a location in the memory device 5. The block management includes management of defective blocks, wear leveling, and garbage collection.

Next, an internal configuration of the memory device 5 will be explained. The memory device 5 includes multiple nonvolatile memory chips 50. The nonvolatile memory chips 50 are, for example, multiple NAND flash memory dies. The nonvolatile memory chips 50 include, for example, nonvolatile memory chips 501, 502, 511, 512, 571, and 572. The number of the nonvolatile memory chips 50 included in the memory device 5 is freely determined. Hereinafter, one of the nonvolatile memory chips 50 may be referred to as a nonvolatile memory chip 50.

The nonvolatile memory chip 50 includes a memory cell array. The memory cell array contains multiple memory cells. The memory cells are arranged in a matrix.

The nonvolatile memory chip 50 includes multiple blocks. The blocks each function as a minimum data erasure unit. The block may also be referred to as an erasure block or a physical block. Each of the blocks includes multiple pages. The pages each function as a unit of a data write operation and a data read operation. Each of the pages includes multiple memory cells connected to a single word line. Note that a word line may function as a unit of a data write operation and a data read operation.

The tolerable maximum number of program/erase cycles (maximum number of P/E cycles) for each of the blocks is limited. One P/E cycle of a block includes a data erase operation and a data write operation. The data erase operation is an operation to erase data stored in all memory cells in the block. The data write operation is an operation to write data in each page of the block.

Each of the nonvolatile memory chips 50 is connected to any of multiple channels 7. Each of the channels 7 serves as a transmission path of signal and data. The number of nonvolatile memory chips 50 that are connected to each of the channels 7 is freely determined.

FIG. 1 illustrates an example of a case where the channels 7 are eight channels. The eight channels 7 are composed of a 0th channel ch0, a first channel ch1, . . . , and a seventh channel ch7. To each of the eight channels 7, two nonvolatile memory chips 50 are connected. Specifically, to the 0th channel ch0, the nonvolatile memory chips 501 and 502 are connected. To the first channel ch1, the nonvolatile memory chips 511 and 512 are connected. To the seventh channel ch7, the nonvolatile memory chips 571 and 572 are connected. Next, an internal configuration of the controller 4 will be explained. The controller 4 includes a host interface (host I/F) 11, a CPU 12, multiple nonvolatile memory interfaces (nonvolatile memory I/Fs) 13, a volatile memory interface (volatile memory I/F) 14, a hardware engine (HW engine) 15, and interconnects 16 and 17.

The host I/F 11 is a hardware interface through which the semiconductor storage device 3 and an external perform communication. Commands received from the external include, for example, a write command and a read command.

The CPU 12 is at least one processor. The CPU 102 is, for example, a circuit such as SoC. The CPU 102 operates according to a program such as a firmware (FW).

The nonvolatile memory I/Fs 13 are hardware interfaces through which the controller 4 and the memory device 5 perform communication. The nonvolatile memory I/Fs 13 conform to an interface standard such as a Toggle DDR and an Open NAND Flash Interface (ONFI). Each of the nonvolatile memory I/Fs 13 is connected to a channel 7. Hence, each of the nonvolatile memory I/Fs 13 is connected, via the channel 7, to at least one nonvolatile memory chip 50 provided in the memory device 5. Each of the nonvolatile memory I/Fs 13 controls the at least one nonvolatile memory chip 50 that is connected via the channel 7. The number of the nonvolatile memory I/Fs 13 corresponds to, for example, the number of the channels 7.

The volatile memory I/F 14 is a hardware interface through which the controller 4 and the volatile memory 6 perform communication. The volatile memory I/F 14 conforms to an interface standard such as a DDR.

The HW engine 15 is a circuit that perform a specific process. The specific process is a freely determined process that is performed in the semiconductor storage device 3. The specific process is, for example, error correction, encoding, encryption, or decoding of data. The HW engine 15 is, for example, a circuit such as an SoC. The HW engine 15 includes, for example, HW engines 15A, 15B, 15C, and 15D. Each of the HW engines 15A, 15B, 15C, and 15D is a circuit that performs at least a part of the specific process.

The interconnects 16 and 17 are transmission paths of signal and data. The interconnects 16 and 17 mutually connect the host I/F 11, the CPU 12, the nonvolatile memory I/Fs 13-0, 13-1, and 13-7, the volatile memory I/F 14, and the HW engines 15A, 15B, 15C, and 15D. More specifically, the interconnect 16 mutually connects the CPU 12, the HW engines 15A, 15B, 15C, and 15D, and the interconnect 17. The interconnect 17 mutually connects the host I/F 11, the nonvolatile memory I/Fs 13-0, 13-1, and 13-7, the volatile memory I/F 14, and the interconnect 16. The interconnect 17 includes a bus 18 and a bus arbiter 19.

The bus 18 is a transmission path itself of signal and data. The bus 18 is a resource shared by multiple bus masters. The bus masters are devices that may perform data transfer via the bus 18. The bus masters each request use of the bus 18. For example, the host I/F 11, the CPU 12, the volatile memory I/F 14, the nonvolatile memory I/Fs 13-0, 13-1, and 13-7, and the HW engines 15A, 15B, 15C, and 15D may operate as the bus masters. The bus 18 is used for, for example, data transfer between the volatile memory 6 and each of the nonvolatile memory chips 50. As a transfer protocol of the bus 18, Advanced extensible Interface (AXI) is used, for example.

The bus arbiter 19 is a circuit that dynamically controls use of the bus 18 on the basis of the bandwidth of the bus 18. The bandwidth of the bus 18 represents an upper limit of a transfer rate of data via the bus 18.

The bus arbiter 19 includes an arbitration circuit 21 and a coordination circuit 22.

The arbitration circuit 21 is a circuit that evenly assigns a use right of the bus 18 to a bus master. When a use right of the bus 18 is requested by a bus master, the arbitration circuit 21 assigns the use right of the bus 18 to the bus master. More specifically, when the use right of the bus 18 is requested by the bus master, the arbitration circuit 21 returns a response, which indicates that the use of the bus 18 is permitted, to the bus master. The assigned use right of the bus 18 (that is, the received response indicating that the use of the bus 18 is permitted) enables the bus master to perform data transfer via the bus 18.

The coordination circuit 22 is a circuit that accepts a use notice of the bus 18 from a bus master. The use notice is a prior notice indicating that the bus 18 will be used. The coordination circuit 22 accepts the use notice of the bus 18 on the basis of, for example, the bandwidth of the bus 18. More specifically, the coordination circuit 22 accepts the use notice of the bus 18 so that the number of bus masters that are using the bus 18 is equal to or less than an upper limit. The upper limit is an upper limit of the number of bus masters that are using the bus 18 in parallel. The upper limit is an integer of one or more. The upper limit is determined on the basis of, for example, the bandwidth of the bus 18. More specifically, the upper limit is determined so that the data transfer rate does not become slow regardless of the bandwidth of the bus 18 that is a bottleneck, even if the bus masters as much as the upper limit perform data transfer via the bus 18 in parallel. Note that each of the bus masters, which perform data transfer via the bus 18 in parallel, performs the data transfer at a data transfer rate whose upper limit is set equal to all the bus masters. Upon acceptance of the use notice of the bus 18, the bus master becomes capable of requesting the arbitration circuit 21 to assign a use right of the bus 18. In other words, the bus master operates so as not to request the arbitration circuit 21 to assign the use right of the bus 18 until the use notice of the bus 18 is accepted.

The coordination circuit 22 includes a counter 41 and a use notice queue 42.

The counter 41 counts the number of bus masters that are using the bus 18. The initial value of the counter 41 is zero. The value of the counter 41 is incremented by one when the coordination circuit 22 accepts a use notice from a bus master. The value of the counter 41 is decremented by one when a bus master notifies the coordination circuit 22 of completion of data transfer via the bus 18. That is, the value of the counter 41 indicates the number of bus masters, each of which has not yet notified the coordination circuit 22 of completion of data transfer after the notified use notice of the bus 18 is accepted by the coordination circuit 22. The counter 41 includes, for example, multiple flip-flop circuits. A flip-flop circuit is a circuit that stores 1-bit information. The flip-flop circuits represent the number of bus masters that are using the bus 18, with, for example, signed binary numbers.

The use notice queue 42 is a queue that stores a bus master ID. The bus master ID is identification information (ID) that uniquely identifies a corresponding bus master. The bus master ID stored in the use notice queue 42 corresponds to a bus master that has notified a use notice having not yet been accepted by the coordination circuit 22. The use notice queue 42 is realized as, for example, a first-in first-out (FIFO) ring buffer.

Figure 2:
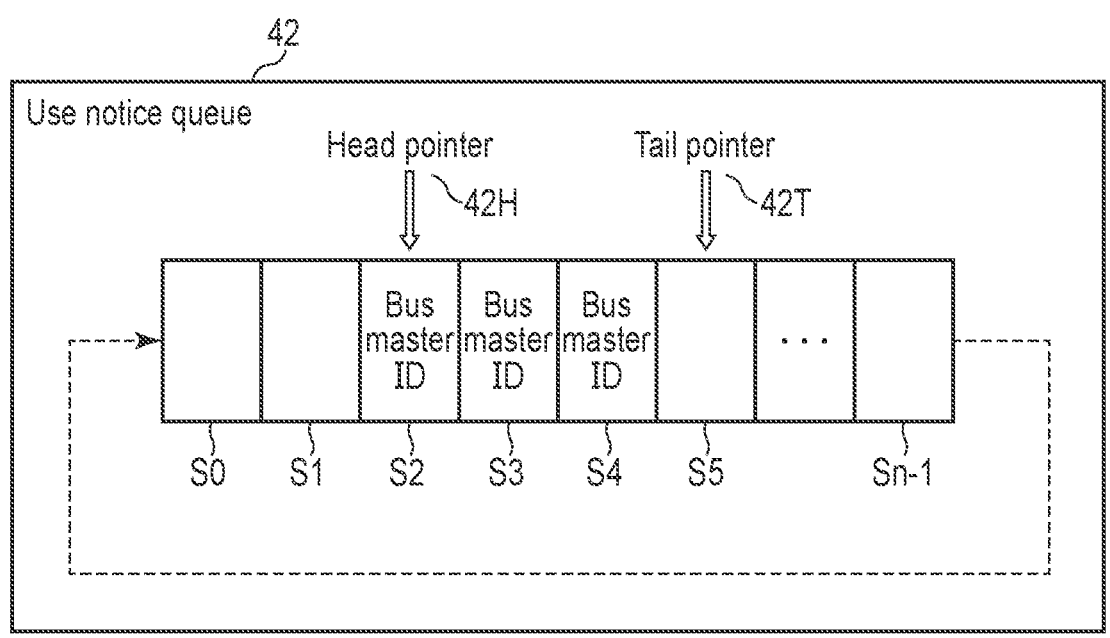
FIG. 2 is a diagram illustrating an example of a use notice queue of the semiconductor storage device according to the embodiment.

FIG. 2 is a diagram illustrating an example of the use notice queue 42 of the semiconductor storage device 3 according to the embodiment.

The use notice queue 42 includes multiple storage areas S0, S1, S2, S3, S4, S5, and Sn−1.

Hereinafter, a storage area included in the use notice queue 42 will be referred to as a slot. Each of the slots S0, S1, S2, S3, S4, S5, . . . and Sn-1 may store one bus master ID. The number of slots n included in the use notice queue 42 (that is, a queue size n) corresponds to, for example, the total number of bus masters that use the bus 18.

The use notice queue 42 further includes a tail pointer 42T and a head pointer 42H. The tail pointer 42T indicates a slot in which the coordination circuit 22 stores a bus master ID. The tail pointer 42T is incremented by one, every time the coordination circuit 22 stores a bus master ID in a slot. When the incremented tail pointer 42T has reached the queue size n, the tail pointer 42T is set to zero. The head pointer 42H indicates a slot from which the coordination circuit 22 acquires a bus master ID. The head pointer 42H is incremented by one, every time the coordination circuit 22 acquires a bus master ID from a slot. When the incremented head pointer 42H has reached the queue size n, the head pointer 42H is set to zero. In FIG. 2, the slot S5 is a slot to which a bus master ID is to be stored, and the slot S2 is a slot from which a bus master ID is to be acquired. Each slot from the slot indicated by the head pointer 42H to the slot just before the slot indicated by the tail pointer 42T stores a bus master ID. Hence, when the tail pointer 42T and the head pointer 42H indicate different slots, the use notice queue 42 stores at least one bus master ID. A bus master ID stored in a slot is discarded, after acquired by the coordination circuit 22. The slot where the discarded bus master ID was stored, becomes capable of storing a new bus master ID.

Next, an operation in a case where data transfer via the bus 18 is performed in the semiconductor storage device 3 will be explained. Hereinafter, a case where the data transfer via the bus 18 is performed in a data write operation will be exemplified. The data write operation is, for example, an operation of writing user data, which is stored in the volatile memory 6, into the nonvolatile memory chip 50. The data write operation includes (1) an operation of transferring user data from the volatile memory 6 to the nonvolatile memory chip 50 via the bus 18, and (2) an operation of writing (programming) the transferred user data into the nonvolatile memory chip 50. The operation (1) will be referred to as a write data transfer operation. The operation (2) will be referred to as a program operation. In the program operation, the bus 18 is not used.

FIG. 3 is a sequence diagram illustrating an example of the data write operation in the semiconductor storage device 3 according to the embodiment. Here, it is assumed that the data write operation is performed on the nonvolatile memory chip 501. The nonvolatile memory chip 501 is connected to the 0th channel ch0. The volatile memory 6 stores user data to be written into the nonvolatile memory chip 501. The same operation is performed also when the data write operation is performed on each of the other nonvolatile memory chips 50.

The nonvolatile memory I/F 13-0 notifies the coordination circuit 22 of a use notice of the bus 18 when there is data to be transferred via the bus 18 (A1).

Upon receiving the use notice of the bus 18 from the nonvolatile memory I/F 13-0, the coordination circuit 22 determines whether the value of the counter 41 is less than the upper limit (A2). Specifically, the coordination circuit 22 calculates, for example, a difference obtained by subtracting the upper limit from the value of the counter 41. The coordination circuit 22 then determines whether the value of the counter 41 is less than the upper limit, according to whether the calculated difference is a negative value or not. For example, the coordination circuit 22 determines whether the value of the counter 41 is less than the upper limit, according to whether the most significant bit (sign bit) of the calculated difference is one. When the calculated difference is a negative value (that is, when the most significant bit of the calculated difference is one), the coordination circuit 22 determines that the value of the counter 41 is less than the upper limit. When the calculated difference is not a negative value (that is, when the most significant bit of the calculated difference is zero), the coordination circuit 22 determines that the value of the counter 41 is equal to or more than the upper limit.

Hereinafter, (A) a case where the value of the counter 41 is less than the upper limit will be described.

(A) Case with Value of Counter 41 Less than Upper Limit

In a case where the value of the counter 41 is less than the upper limit, the coordination circuit 22 accepts the use notice of the bus 18. Specifically, the coordination circuit 22 adds one to the counter 41 (A3). The coordination circuit 22 then returns a response (ACK) indicating that the use notice of the bus 18 is accepted, to the nonvolatile memory I/F 13-0 (A4). The response indicating that the use notice of the bus 18 is accepted is also referred to as a first response.

Upon receiving the first response from the coordination circuit 22, the nonvolatile memory I/F 13-0 requests the arbitration circuit 21 to assign the use right of the bus 18 (A5). Note that the nonvolatile memory I/F 13-0 operates so as not to request the arbitration circuit 21 to assign the use right of the bus 18, until receiving the first response from the coordination circuit 22.

When the use right of the bus 18 is requested by the nonvolatile memory I/F 13-0, the arbitration circuit 21 returns a response indicating that use of the bus 18 is permitted, to the nonvolatile memory I/F 13-0 (A6). The response indicating that use of the bus 18 is permitted is also referred to as a second response.

Upon receiving the second response from the arbitration circuit 21, the nonvolatile memory I/F 13-0 performs a write data transfer operation.

Specifically, the nonvolatile memory I/F 13-0 transmits an address and a burst length to the bus 18 (A7). The address indicates a location in which data to be transferred is stored. The burst length indicates the number of times of data transfer in burst data transfer. The address and the burst length are received by, for example, the volatile memory I/F 14.

Upon receiving the address and the burst length, the volatile memory I/F 14 reads user data from the volatile memory 6 (A8). The volatile memory I/F 14 then transfers the read user data to the nonvolatile memory I/F 13-0 via the bus 18 (A9).

Next, the nonvolatile memory I/F 13-0 transmits a chip enable signal to the nonvolatile memory chip 501 via the 0th channel ch0 (A10). The chip enable signal indicates that the nonvolatile memory I/F 13-0 accesses the corresponding nonvolatile memory chip 50. The nonvolatile memory I/F 13-0 writes the transferred user data into the nonvolatile memory chip 501 via the 0th channel ch0 (A11).

Upon completion of the write data transfer operation, the nonvolatile memory I/F 13-0 notifies the coordination circuit 22 of completion of the data transfer (A12).

When completion of the data transfer is notified of by the nonvolatile memory I/F 13-0, the coordination circuit 22 subtracts one from the counter 41 (A13).

The coordination circuit 22 thus manages the number of bus masters that are using the bus 18, with use of the counter 41. When the value of the counter 41 is less than the upper limit, the coordination circuit 22 accepts a use notice of the bus 18 that is issued by the nonvolatile memory I/F 13. That is, the coordination circuit 22 accepts the use notice of the bus 18 so that the number of bus masters that are using the bus 18 is equal to or less than the upper limit. This prevents the data transfer rate via the bus 18 from becoming slow because of the bandwidth of the bus 18 that is a bottleneck.

Next, (B) a case where it is determined that the value of the counter 41 is equal to or larger than the upper limit, in A2 in FIG. 3 will be described.

(B) Case with Value of Counter 41 Equal to or Larger than Upper Limit

Figure 4:
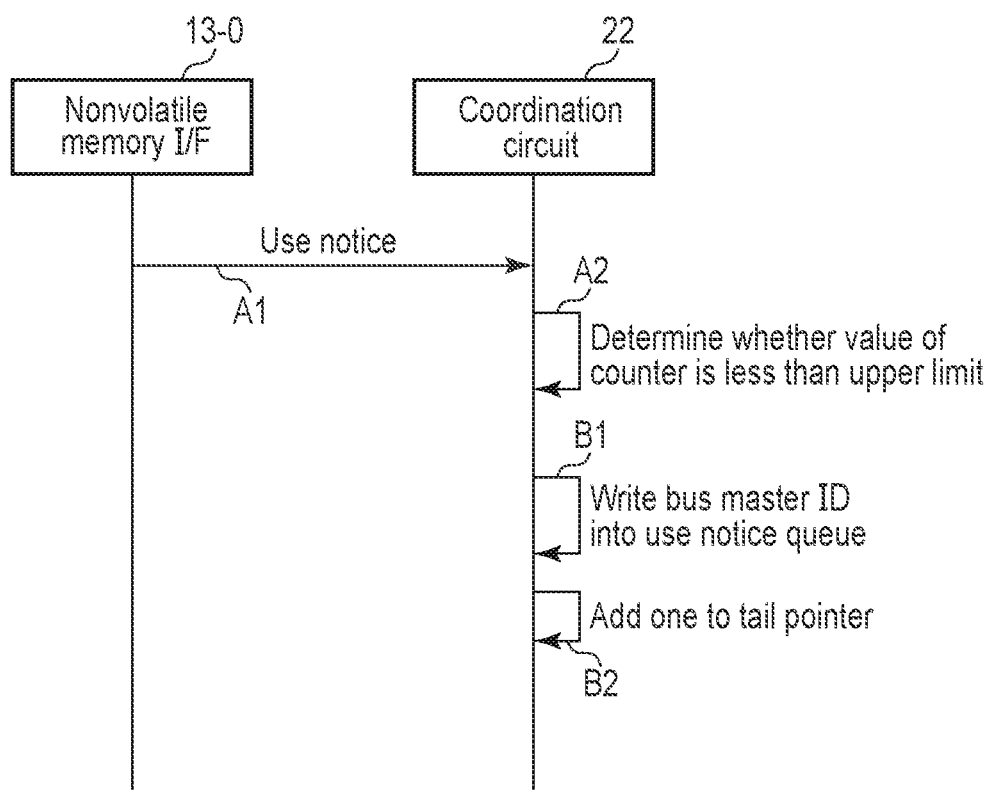
FIG. 4 is a sequence diagram illustrating an example of an operation in the semiconductor storage device according to the embodiment in a case where a value of a counter is an upper limit or more.

FIG. 4 is a sequence diagram illustrating an example of an operation in the semiconductor storage device 3 according to the embodiment in a case where the value of the counter 41 is equal to or larger than the upper limit. A1 and A2 illustrated in FIG. 4 are similar to A1 and A2 illustrated in FIG. 3.

When the value of the counter 41 is equal to or larger than the upper limit, the coordination circuit 22 stores an ID (bus master ID) of the nonvolatile memory I/F 13-0 to the use notice queue 42. In more detail, the coordination circuit 22 writes the ID of the nonvolatile memory I/F 13-0 into the slot of the use notice queue 42 that is indicated by the tail pointer 42T (B1). The coordination circuit 22 then adds one to the tail pointer 42T (B2). If the value of the tail pointer to which one is added, reaches the queue size n of the use notice queue 42, the coordination circuit 22 sets the tail pointer 42T to zero.

When the value of the counter 41 becomes smaller than the upper limit after one is added to the tail pointer 42T in B2, the coordination circuit 22 accepts a use notice by using the use notice queue 42. An operation in a case where the value of the counter 41 becomes smaller than the upper limit after one is added to the tail pointer 42T will be described below.

FIG. 5 is a sequence diagram illustrating an example of an operation in the semiconductor storage device 3 according to the embodiment in a case where the value of the counter 41 becomes smaller than the upper limit after one is added to the tail pointer 42T.

The coordination circuit 22 acquires the heading bus master ID from the use notice queue 42. The heading bus master ID is a bus master ID that corresponds to a bus master that provided the use notice earliest, among the bus master IDs stored in the use notice queue 42. The slot of the use notice queue 42 in which the heading bus master ID is stored is indicated by the head pointer 42H. Specifically, the coordination circuit 22 reads the heading bus master ID from the slot of the use notice queue 42 that is indicated by the head pointer 42H (C1). The coordination circuit 22 then adds one to the head pointer 42H (C2). Note that if the value of the head pointer 42H to which one is added reaches the queue size n of the use notice queue 42, the coordination circuit 22 sets the head pointer 42H to zero.

Next, the coordination circuit 22 adds one to the counter 41 (C3). The coordination circuit 22 then returns a first response to a bus master that corresponds to the acquired bus master ID. For example, in a case where the bus master that corresponds to the acquired bus master ID is the nonvolatile memory I/F 13-0, the coordination circuit 22 returns the first response to the nonvolatile memory I/F 13-0 (C4). The subsequent operations from C5 to C13 are similar to the operations from A5 to A13 illustrated in FIG. 3.

Note that the coordination circuit 22 does not accept a use notice while a bus master ID is stored in the use notice queue 42 and the value of the counter 41 is equal to or larger than the upper limit.

The coordination circuit 22 thus stores the ID of the nonvolatile memory I/F 13-0 to the use notice queue 42 in a case where the value of the counter 41 is equal to or larger than the upper limit. Upon falling of the value of the counter 41 below the upper limit, the coordination circuit 22 acquires a bus master ID from the use notice queue 42. The coordination circuit 22 then accepts a use notice issued by a bus master that corresponds to the acquired bus master ID. For example, in a case where the bus master that corresponds to the acquired bus master ID is the nonvolatile memory I/F 13-0, the coordination circuit 22 accepts the use notice issued by the nonvolatile memory I/F 13-0.

Hence, the coordination circuit 22 accepts the use notice of the bus 18 so that the number of bus masters that are using the bus 18 is the upper limit or less. This prevents the data transfer rate via the bus 18 from becoming slow because of the bandwidth of the bus 18 that is a bottleneck.

Although FIG. 3 exemplified the case where the nonvolatile memory I/F 13-0 operates as a bus master, also any of other nonvolatile memory I/Fs 13-1, . . . , and 13-7, the host I/F 11, the CPU 12, the volatile memory I/F 14, and the HW engines 15A, 15B, 15C, and 15D may operate as a bus master in the same way. The bus masters may operate in parallel.

FIG. 6 is a diagram illustrating an example of a time chart of data write operations in the semiconductor storage device 3 according to the embodiment. In FIG. 6, Din represents data-in time. The data-in time is a time during which a write data transfer operation is performed. tProg represents a program time. The program time is a time during which a program operation is performed. Here, it is assumed that data write operations on eight nonvolatile memory chips 50 are performed repetitively and in parallel. Each of the eight nonvolatile memory chips 50 is connected to one of eight channels 7. One data write operation on each of the eight nonvolatile memory chips 50 performed in parallel, is referred to as one-cycle data write operation. That is, the one cycle data write operation includes one data write operation on each of the eight nonvolatile memory chips 50. An example in which data is written into the eight nonvolatile memory chips 50 via the eight channels in multi-cycle data write operation will be described below. Note that in the multi-cycle data write operation, the nonvolatile memory chip 50 into which data is written via one channel 7 is not always necessarily the same one, but may be different ones for every cycle.

(A) of FIG. 6 illustrates an example of a time chart of a data write operation in which a use notice is not used. The data write operation in which a use notice is not used is not an operation that is performed in the semiconductor storage device 3 according to the embodiment. In the data write operation in which a use notice is not used, a write data transfer operation is performed without considering the bandwidth of a bus. Each of eight nonvolatile memory I/Fs requests an arbiter circuit to assign a use right of the bus without notifying a coordination circuit of a use notice of the bus. The arbiter circuit permits each of the eight nonvolatile memory I/Fs to use the bus.

Then, write data transfer operations in Din 801 on eight channels ch0C, ch1C, ch2C, ch3C, ch4C, ch5C, ch6C, and ch7C are started all at once. The time at which the write data transfer operations in Din 801 are started is denoted as time to. The write data transfer operations in Din 801 are performed via the bus and the respective eight channels ch0C, ch1C, ch2C, ch3C, ch4C, ch5C, ch6C, and ch7C. Specifically, the write data transfer operation via the bus and the 0th channel ch0C is performed. The write data transfer operation via the bus and the first channel ch1C is performed. Similarly, the write data transfer operations via the bus and the respective other six channels ch2C, ch3C, ch4C, ch5C, ch6C, and ch7C are performed.

Upon completion of the write data transfer operations in Din 801, program operations in tProg 802 are performed. The program operations in tProg 802 are program operations on the respective eight channels ch0C, ch1C, ch2C, ch3C, ch4C, ch5C, ch6C, and ch7C. Specifically, the data transferred via the bus is written via the 0th channel ch0C. The data transferred via the bus is written via the first channel ch1C. Similarly, the data transferred via the bus is written via the respective other six channels ch2C, ch3C, ch4C, ch5C, ch6C, and ch7C. The time at which the program operations in tProg 802 complete is denoted as time ta1. That is, the time at which the first cycle data write operation on the eight nonvolatile memory chips completes is denoted as time ta1.

Next, each of the eight nonvolatile memory I/Fs request the arbiter circuit to assign a use right of the bus. The arbiter circuit permits each of the eight nonvolatile memory I/Fs to use the bus. Then, write data transfer operations in Din 803 on the respective eight channels ch0C, ch1C, ch2C, ch3C, ch4C, ch5C, ch6C, and ch7C are started all at once. The write data transfer operations in Din 803 are performed via the bus and the respective eight channels ch0C, ch1C, ch2C, ch3C, ch4C, ch5C, ch6C, and ch7C.

Upon completion of the write data transfer operations in Din 803, program operations in tProg 804 are performed. The program operations in tProg 804 are program operations on the respective eight channels ch0C, ch1C, ch2C, ch3C, ch4C, ch5C, ch6C, and ch7C. The time at which the program operations in tProg 804 complete is denoted as time ta2. That is, the time at which the second cycle data write operation on the eight nonvolatile memory chips completes is denoted as time ta2.

In the semiconductor storage device, the data write operation is repetitively performed in the same way. The time at which the third cycle data write operation on the eight nonvolatile memory chips completes is denoted as time ta3. The time at which the fourth cycle data write operation on the eight nonvolatile memory completes is denoted as time ta4. The time at which the fifth cycle data write operation on the eight nonvolatile memory chips completes is denoted as time ta5. In addition, the time at which the sixth cycle data write operation on the eight nonvolatile memory chips completes is denoted as time ta6.

In the six-cycle data write operation, data portions that correspond to eight write operations are transferred simultaneously in the write data transfer operations in each of Dins 801, 803, 805, 807, 809, and 811. In this case, one Din is, for example, 400 microseconds (μs).

(B) of FIG. 6 illustrates an example of a time chart of a data write operation in which a use notice is used. In the data write operation in which a use notice is used, a write data transfer operation is performed on the basis of the bandwidth of the bus 18. In a case where a use notice is used, each of the eight nonvolatile memory I/Fs 13 notifies the coordination circuit 22 of a use notice of the bus 18 before starting a write data transfer operation. The coordination circuit 22 accepts the use notice of the bus 18 so that the value of the counter 41 (that is, the number of bus masters that are using the bus 18) is equal to or smaller than the upper limit. In the example illustrated in (B) of FIG. 6, the upper limit is four. The coordination circuit 22 returns a first response to the accepted use notice, to the corresponding nonvolatile memory I/F 13. After receiving the first response to the use notice that was notified of, each of the eight nonvolatile memory I/Fs 13 requests the arbitration circuit 21 to assign a use right of the bus 18. In accordance with the request to assign the use right of the bus 18, the arbitration circuit 21 permits the nonvolatile memory I/F 13, having issued the request, to use the bus 18.

Specifically, first, each of the eight nonvolatile memory I/Fs 13 notifies the coordination circuit 22 of a use notice of the bus 18. The coordination circuit 22 accepts, for example, the use notice from each of the nonvolatile memory I/Fs 13 that are connected to the 0th channel ch0, the first channel ch1, the second channel ch2, and the third channel ch3, respectively. The value of the counter 41 then changes from zero to four. Each of the four nonvolatile memory I/Fs 13 whose use notice has been accepted then requests the arbitration circuit 21 to assign the use right of the bus 18. The arbitration circuit 21 permits each of the four nonvolatile memory I/Fs 13, having requested the use right, to use the bus 18.

Here, the four channels 7 that include the 0th channel ch0, the first channel ch1, the second channel ch2, and the third channel ch3 are referred to as channels in a first group a1. The four nonvolatile memory I/Fs 13 connected to the channels in the first group a1 are referred to as nonvolatile memory I/Fs in the first group.

Then, write data transfer operations in Din 851 on the channels in the first group a1 are started all at once. The time at which the write data transfer operations in Din 851 are started is denoted as time to. The write data transfer operations in Din 851 are performed via the bus 18 and the respective channels in the first group a1. Specifically, the write data transfer operation via the bus 18 and the 0th channel ch0C is performed. The write data transfer operation via the bus 18 and the first channel ch1C is performed. Similarly, the write data transfer operations via the bus 18 and the respective other channels in the first group, which are the second channel ch2 and the third channel ch3, are performed.

Upon completion of the data transfer operations in Din 851, the value of the counter 41 changes to zero. The coordination circuit 22 newly accepts use notices from the nonvolatile memory I/Fs 13 that are connected to the fourth channel ch4, the fifth channel ch5, the sixth channel ch6, and the seventh channel ch7, respectively, on the basis of the value of the counter 41. The value of the counter 41 then changes to four. Each of the four nonvolatile memory I/Fs 13 whose use notice has been accepted then request the arbitration circuit 21 to assign the use right of the bus 18. The arbitration circuit 21 permits each of the four nonvolatile memory I/Fs 13, having requested the use right, to use the bus 18.

Here, the four channels 7 that includes the fourth channel ch4, the fifth channel ch5, the sixth channel ch6, and the seventh channel ch7 are referred to as channels in a second group a2. The four nonvolatile memory I/Fs 13 that are connected to the channels in the second group a2 are referred to as nonvolatile memory I/Fs in the second group.

Next, program operations in tProg 852 and write data transfer operations in Din 853 are started.

The program operations in tProg 852 are program operations on the channels in the first group a1. Specifically, the data transferred via the bus 18 is written into the nonvolatile memory chip 501 or 502 connected to the 0th channel ch0. The data transferred via the bus 18 is written into the nonvolatile memory chip 511 or 512 connected to the first channel ch1. Similarly, the data transferred via the bus 18 is written via each of the other channels in the first group, which are the second channel ch2 and the third channel ch3.

The write data transfer operations in Din 853 are write data transfer operations on the channels in the second group a2 that are performed all at once. The write data transfer operations in Din 853 are performed via the bus 18 and the respective channels in the second group a2. Specifically, the write data transfer operation via the bus 18 and the seventh channel ch7 is performed. Similarly, the write data transfer operation via the bus 18 and each of the other channels in the second group, which are the fourth channel ch4, the fifth channel ch5, and the sixth channel ch6, is performed.

A part of the program operations in tProg 852 and the write data transfer operations in Din 853 are performed in parallel.

Upon completion of the data transfer operations in Din 853, the value of the counter 41 changes to zero. Then, program operations in tProg 854 are performed.

The program operations in tProg 854 are program operations on the channels in the second group a2. Specifically, the data transferred via the bus 18 is written into the nonvolatile memory chip 571 or 572 connected to the seventh channel ch7. Similarly, the data transferred via the bus 18 is written via each of the other channels in the second group, which are the fourth channel ch4, the fifth channel ch5, and the sixth channel ch6. A part of the program operations in tProg 854 is performed in parallel with a part of the program operations in tProg 852. The time at which the program operations in tProg 854 complete is denoted as time tb1. That is, the time at which the first cycle data write operation on the eight nonvolatile memory chips 50 completes is denoted as time tb1.

Upon completion of the program operations in tProg 852, the coordination circuit 22 accepts new use notices from the nonvolatile memory I/Fs in the first group on the basis of the value of the counter 41. The value of the counter 41 then changes to four. Each of the nonvolatile memory I/Fs 13 in the first group, whose use notice has been accepted, then requests the arbitration circuit 21 to assign the use right of the bus 18. The arbitration circuit 21 permits each of the nonvolatile memory I/Fs in the first group, having requested the use right, to use the bus 18. Then, write data transfer operations in Din 855 on the channels in the first group a1 are started all at once. The write data transfer operations in Din 855 are performed via the bus 18 and the respective channels in the first group a1. The write data transfer operations in Din 855 are performed in parallel with a part of the program operations in tProg 854. The time at which the write data transfer operations in Din 855 complete is denoted as time tb1.

Upon completion of the data transfer operations in Din 855, the value of the counter 41 changes to zero. The coordination circuit 22 accepts new use notices from the nonvolatile memory I/Fs in the second group on the basis of the value of the counter 41. The value of the counter 41 then changes to four. Each of the nonvolatile memory I/Fs in the second group, whose use notice has been accepted, requests the arbitration circuit 21 to assign the use right of the bus 18. The arbitration circuit 21 permits each of the nonvolatile memory I/Fs in the second group, having requested the use right, to use the bus 18.

Then, program operations in tProg 856 and write data transfer operations in Din 857 are started. The program operations in tProg 856 are program operations on the channels in the first group a1. The write data transfer operations in Din 857 are performed via the bus 18 and the respective channels in the second group a2. A part of the program operations in tProg 856 is performed in parallel with the write data transfer operations in Din 857.

Upon completion of the data transfer operations in Din 857, the value of the counter 41 changes to zero. Then, program operations in tProg 858 are performed. The program operations in tProg 858 are program operations on the respective channels in the second group a2. A part of the program operations in tProg 858 is performed in parallel with a part of the program operations in tProg 856. The time at which the program operations in tProg 858 complete is denoted as time tb2. That is, the time at which the second cycle data write operation on the eight nonvolatile memory chips 50 completes is denoted as time tb2.

In the semiconductor storage device 3, the data write operation is repetitively performed in the same way. The time at which the third cycle data write operation on the eight nonvolatile memory chips 50 completes is denoted as time tb3. The time at which the fourth cycle data write operation on the eight nonvolatile memory chips 50 completes is denoted as time tb4. The time at which the fifth cycle data write operation on the eight nonvolatile memory chips 50 completes is denoted as time tb5. The time at which the sixth cycle data write operation on the eight nonvolatile memory chips 50 is denoted as time tb6.

In the six-cycle data write operation, data portions that correspond to four write operations are transferred simultaneously in the data write operations in each of Dins 851, 853, 855, 857, 859, 861, 863, 865, 867, 869, 871 and 873. In this case, one Din is, for example, 300 μs.

As described above, one Din in the data write operation illustrated in (B) of FIG. 6 is shorter than one Din in the data write operation illustrated in (A) of FIG. 6. The data write operation illustrated in (B) of FIG. 6 can prevent the data transfer rate from becoming slow because of the bandwidth of the bus 18 that is a bottleneck. This is because the coordination circuit 22 accepts a use notice of the bus 18 so that the value of the counter 41 (that is, the number of bus masters that are using the bus 18) is equal to or less than the upper limit.

Hence, for example, time tb6 at which the six-cycle data write operation illustrated in (B) of FIG. 6 completes, falls earlier than time ta6 at which the six-cycle data write operation illustrated in (A) of FIG. 6 completes. Hence, the semiconductor storage device 3 according to the embodiment controls the number of bus masters that are using the bus 18 to the upper limit or less by using the use notice, thereby improving the write performance into the nonvolatile memory chip 50.

Similarly, the semiconductor storage device 3 can improve the read performance from the nonvolatile memory chip 50 in a data read operation. The data read operation includes an operation of reading data from the nonvolatile memory chip 50, and an operation of transferring the read data from the nonvolatile memory chip 50 to the volatile memory 6 via the bus 18. Also the data read operation can prevent the data transfer rate from becoming slow because of the bandwidth of the bus 18 that is a bottleneck.

The semiconductor storage device 3 thus controls the number of bus masters that are using the bus 18 to the upper limit or less by using the use notice. This improves the access performance to the nonvolatile memory chips 50.

Figure 7:
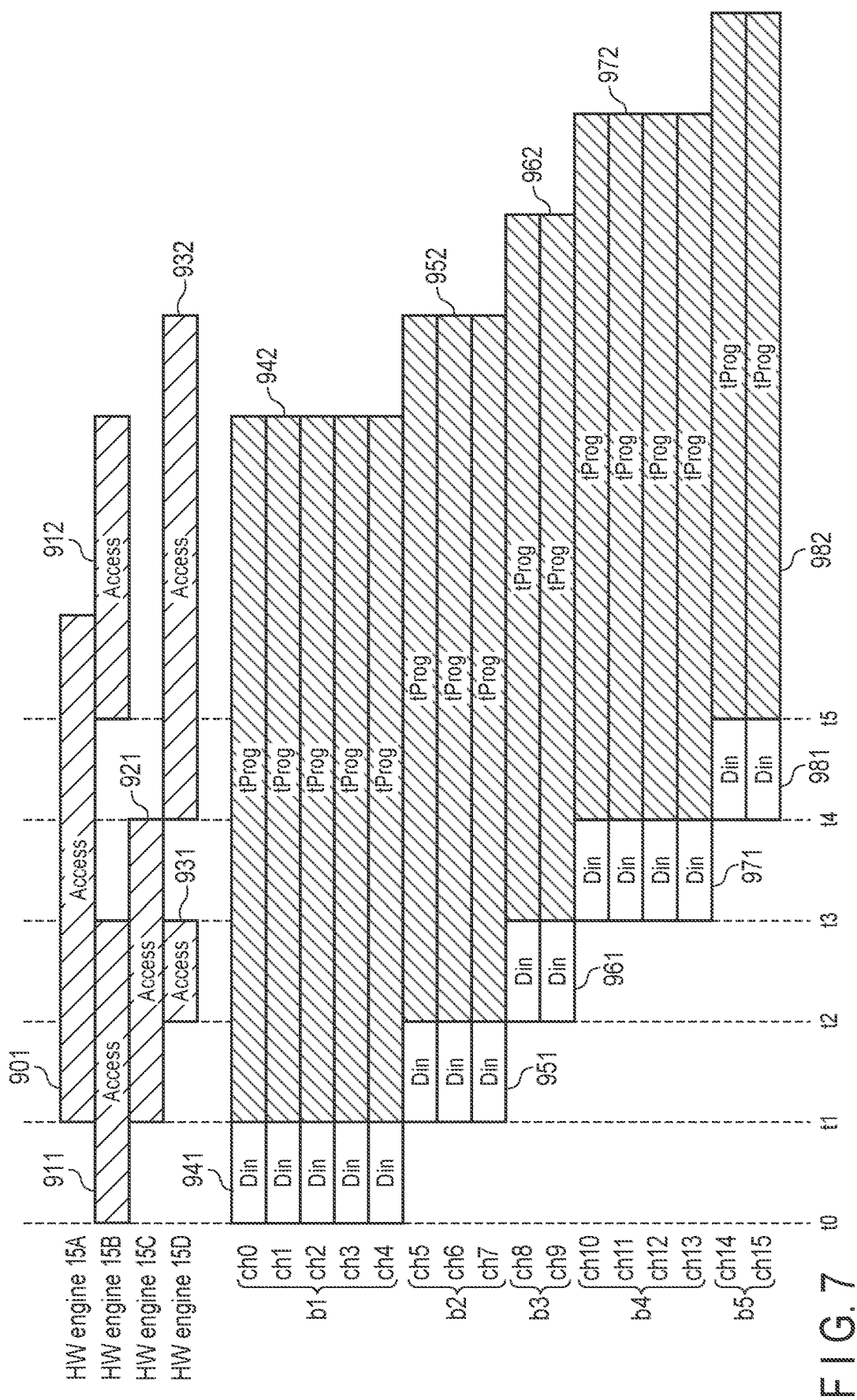
FIG. 7 is a diagram illustrating an example of a time chart of an operation in the semiconductor storage device according to the embodiment in a case where use of a bus is controlled with use of a use notice.

FIG. 7 is a diagram illustrating an example of a time chart of an operation of the semiconductor storage device 3 according to the embodiment in a case where a use notice is used. In FIG. 7, Din represents a data-in time. tProg represents a program time. Access indicates an access time. The access time is a time during which an access operation is performed. The access operation is an operation in which the HW engine 15 transfers data via the bus 18. Here, it is assumed that access operations by the four HW engines 15A, 15B, 15C, and 15D, and data write operations on sixteen nonvolatile memory chips 50 are performed in parallel. Each of the sixteen nonvolatile memory chips 50 is connected to any of sixteen channels 7. Each of the sixteen channels 7 is connected to any of sixteen nonvolatile memory I/Fs 13.

Each of the sixteen nonvolatile memory I/Fs 13 notifies the coordination circuit 22 of a use notice of the bus 18, before starting a write data transfer operation. Each of the HW engines 15A, 15B, 15C and 15D notifies the coordination circuit 22 of a use notice of the bus 18, before starting an access operation.

The coordination circuit 22 accepts the use notice of the bus 18 so that the value of the counter 41 is equal to or less than the upper limit. In the example illustrated in FIG. 7, the upper limit is six. The coordination circuit 22 returns a first response to the accepted use notice, to the corresponding nonvolatile memory I/F 13, or the corresponding HW engine 15A, 15B, 15C or 15D.

Each of the sixteen nonvolatile memory I/Fs 13 requests, upon receiving a first response to the use notice that the nonvolatile memory I/F 13 notified of, the arbitration circuit 21 to assign the use right of the bus 18. Each of the HW engines 15A, 15B, 15C, and 15D requests, upon receiving a first response to the use notice that the HW engine notified of, the arbitration circuit 21 to assign the use right of the bus 18.

On the basis of the request to assign the use right of the bus 18, the arbitration circuit 21 permits the nonvolatile memory I/F 13, or the HW engine 15A, 15B, 15C or 15D, having issued the request, to use the bus 18.

Specifically, first, each of the sixteen nonvolatile memory I/Fs 13 notifies the coordination circuit 22 of a use notice of the bus 18. Each of the HW engines 15A, 15B, 15C and 15D notifies the coordination circuit 22 of a use notice of the bus 18. The coordination circuit 22 accepts, for example, the use notices from the nonvolatile memory I/Fs 13 that are connected to the 0th channel ch0, the first channel ch1, the second channel ch2, the third channel ch3, and the fourth channel ch4, respectively, and the use notice from the HW engine 15B. The value of the counter 41 then changes from zero to six. The five nonvolatile memory I/Fs 13 and the HW engine 15B, whose use notices have been accepted, then request the arbitration circuit 21 to assign the use right of the bus 18. The arbitration circuit 21 permits the five nonvolatile memory I/Fs 13 and the HW engine 15B, having requested the use right, to use the bus 18. Here, the five channels 7 that include the 0th channel ch0, the first channel ch1, the second channel ch2, the third channel ch3, and the fourth channel ch4 are referred to as channels in a first group b1.

Next, an access operation in Access 911 and write data transfer operations in Din 941 are started. The time at which the access operation in Access 911 and the write data transfer operations in Din 941 are started is denoted as time to. The access operation in Access 911 is an access operation from the HW engine 15B via the bus 18. The write data transfer operations in Din 941 are write data transfer operations on the channels in the first group b1 that are performed all at once. The write data transfer operations in Din 941 are performed via the bus 18 and the respective channels in the first group b1. The time at which the write data transfer operations in Din 941 complete is denoted as time t1. A period from time to to time t1 is a period during which the access operation in Access 911 and the write data transfer operations in Din 941 are performed in parallel.

Upon completion of the data transfer operations in Din 941, the value of the counter 41 changes to one. The value of the counter 41 corresponds to the number of the HW engine 15B that continues to use the bus 18. The coordination circuit 22 newly accepts the use notices from the HW engines 15A and 15C, and the use notices from the nonvolatile memory I/Fs 13 that are connected to the fifth channel ch5, the sixth channel ch6, and the seventh channel ch7, respectively, on the basis of the value of the counter 41. The value of the counter 41 then changes to six. The HW engines 15A and 15C, and the three nonvolatile memory I/Fs 13, whose use notices have been accepted, request the arbitration circuit 21 to assign the use right of the bus 18. The arbitration circuit 21 permits the HW engines 15A and 15C, and the three nonvolatile memory I/Fs 13, having requested the use right, to use the bus 18.

Here, the three channels 7 that include the fifth channel ch5, the sixth channel ch6, and the seventh channel ch7 are referred to as channels in a second group b2.

Next, an access operation in Access 901, an access operation in Access 921, program operations in tProg 942, and write data transfer operations in Din 951 are started. The access operation in Access 901 is an access operation from the HW engine 15A via the bus 18. The access operation in Access 921 is an access operation from the HW engine 15C via the bus 18. The program operations in tProg 942 are program operations on the channels in the first group b1. The write data transfer operations in Din 951 are write data transfer operations on the channels in the second group b2 that are performed all at once. The time at which the write data transfer operations in Din 951 complete is denoted as time t2. A period from time t1 to time t2 is a period during which the access operations in Access 901, 911, and 921, the program operations in tProg 942, and the write data transfer operations in Din 951 are performed in parallel.

Upon completion of the data transfer operations in Din 951, the value of the counter 41 changes to three. The value of the counter 41 corresponds to the number of the HW engines 15A, 15B, and 15C that continue to use the bus 18. The coordination circuit 22 newly accepts the use notice from the HW engine 15D, and the use notices from the nonvolatile memory I/Fs 13 that are connected to the eighth channel ch8 and the ninth channel ch9, respectively, on the basis of the value of the counter 41. The value of the counter 41 then changes to six. The HW engine 15D and the two nonvolatile memory I/Fs 13, whose use notices have been accepted, request the arbitration circuit 21 to assign the use right of the bus 18. The arbitration circuit 21 permits the HW engine 15D and the two nonvolatile memory I/Fs 13, having requested the use right, to use the bus 18.

Here, the two channels 7 that include the eighth channel ch8 and the ninth channel ch9 are referred to as channels in a third group b3.

Next, an access operation in Access 931, program operations in tProg 952, and write data transfer operations in Din 961 are started. The access operation in Access 931 is an access operation from the HW engine 15D via the bus 18. The program operations in tProg 952 are program operations on the channels in the second group b2. The write data transfer operations in Din 961 are write data transfer operations on the channels in the third group b3 that are performed all at once. The time at which the access operations in Access 911 and Access 931 and the write data transfer operations in Din 961 complete is denoted as time t3. A period from time t2 to time t3 is a period during which the access operations in Access 901, 911, 921, and 931, the program operations in tProg 942 and 952, and the write data transfer operations in Din 961 are performed in parallel.

Upon completion of the access operations in Access 911 and Access 931, and the write data transfer operations in Din 961, the value of the counter 41 changes to two. The value of the counter 41 corresponds to the number of the HW engines 15A and 15C that continue to use the bus 18. The coordination circuit 22 newly accepts the use notices from the nonvolatile memory I/Fs 13 that are connected to the tenth channel ch10, the eleventh channel ch11, the twelfth channel ch12, and the thirteenth channel ch13, respectively, on the basis of the value of the counter 41. The value of the counter 41 then changes to six. The four nonvolatile memory I/Fs 13, whose use notices have been accepted, then request the arbitration circuit 21 to assign the use right of the bus 18. The arbitration circuit 21 permits each of the four nonvolatile memory I/Fs 13, having requested the use right, to use the bus 18.

Here, the four channels 7 that include the tenth channel ch10, the eleventh channel ch11, the twelfth channel ch12, and the thirteenth channel ch13 are referred to as channels in a fourth group b4.

Next, program operations in tProg 962 and write data transfer operations in Din 971 are started. The program operations in tProg 962 are program operations on the channels in the third group b3. The write data transfer operations in Din 971 are write data transfer operations on the channels in the fourth group b4 that are performed all at once. The time at which the access operation in Access 921 and the write data transfer operations in Din 971 complete is denoted as time t4. A period from time t3 to time t4 is a period during which the access operations in Access 901 and 921, the program operations in tProg 942, 952, and 962, and the write data transfer operations in Din 971 are performed in parallel.

Upon completion of the access operation in Access 921 and the write data transfer operations in Din 971, the value of the counter 41 changes to one. The value of the counter 41 corresponds to the number of the HW engine 15A that continues to use the bus 18. The coordination circuit 22 newly accepts the use notice from the HW engine 15D, and the use notices from the nonvolatile memory I/Fs 13 that are connected to the fourteenth channel ch14 and the fifteenth channel ch15, respectively, on the basis of the value of the counter 41. The value of the counter 41 then changes to four.

The HW engine 15D and the two nonvolatile memory I/Fs 13, whose use notices have been accepted, request the arbitration circuit 21 to assign the use right of the bus 18. The arbitration circuit 21 permits the HW engine 15D and the two nonvolatile memory I/Fs 13, having requested the use right, to use the bus 18.

Here, the two channels 7 that include the fourteenth channel ch14 and the fifteenth channel ch15 are referred to as channels in a fifth group b5.

Next, an access operation in Access 932, program operations in tProg 972, and write data transfer operations in Din 981 are started. The access operation in Access 932 is an access operation from the HW engine 15D via the bus 18. The program operations in tProg 972 are program operations on the channels in the fourth group b4. The write data transfer operations in Din 981 are write data transfer operations on the channels in the fifth group b5 that are performed all at once. The time at which the write data transfer operations in Din 981 complete is denoted as time t5. A period from time t4 to time t5 is a period during which the access operations in Access 901 and 932, the program operations in tProg 942, 952, 962, and 972, and the write data transfer operations in Din 981 are performed in parallel.

Upon completion of the data transfer operations in Din 981, the value of the counter 41 changes to two. The value of the counter 41 corresponds to the number of the HW engines 15A and 15D that continue to use the bus 18. The coordination circuit 22 newly accepts the use notice from the HW engine 15B on the basis of the value of the counter 41. The value of the counter 41 then changes to three. The HW engine 15B, whose use notice has been accepted, requests the arbitration circuit 21 to assign the use right of the bus 18. The arbitration circuit 21 permits the HW engine 15B, having requested the use right, to use the bus 18.

Next, an access operation in Access 912 and program operations in Din 982 are started. The access operation in Access 912 is an access operation from the HW engine 15B via the bus 18. The program operations in tProg 982 are program operations on the channels in the fifth group b5.

As described above, in the semiconductor storage device 3, the use notices of the bus 18 from the HW engines 15A, 15B, 15C, and 15D, and the sixteen nonvolatile memory I/Fs 13 are accepted so that the value of the counter 41 is equal to or less than the upper limit. That is, in the semiconductor storage device 3, execution of access operations and write data transfer operations is controlled so that the value of the counter 41 is the upper limit or less. The semiconductor storage device 3 can therefore prevent the data transfer rate from becoming slow because of the bandwidth of the bus 18 that is a bottleneck. This can improve, for example, the access performance to the nonvolatile memory chips 50.

In more detail, the coordination circuit 22 accepts a use notice of the bus 18 so that the number of bus masters that are using the bus 18 is equal to or less than the upper limit. The semiconductor storage device 3 can therefore dynamically control the use of the bus 18, irrespective of the number of bus masters that attempt to use the bus 18 or the number of the channels 7. The semiconductor storage device 3 can therefore prevent the data transfer rate from becoming slow because of the bandwidth of the bus 18 that is a bottleneck, even if the number of bus masters that use the bus 18 and the number of channels 7 are variously configured.

Next, the procedure of processes that are performed in the semiconductor storage device 3 will be explained with reference to FIGS. 8 to 12.

FIG. 8 is a flowchart illustrating an example of the procedure of a data transfer control process performed by a bus master, in the semiconductor storage device 3 according to the embodiment. The bus master performs the data transfer control process in a case where data transfer between the bus master and a slave via the bus 18 is performed. The bus master is, for example, any of the host I/F 11, the CPU 12, the HW engines 15A, 15B, 15C, and 15D, the nonvolatile memory I/Fs 13-0, 13-1, . . . , and 13-7, and the volatile memory I/F 14. The slave is a target for which the bus master performs data transfer. The slave is, for example, any of the host I/F 11, the CPU 12, the HW engines 15A, 15B, 15C, and 15D, the nonvolatile memory I/Fs 13-0, 13-1, and 13-7, and the volatile memory I/F 14, but different from the bus master.

First, the bus master notifies the coordination circuit 22 of the bus arbiter 19 of a use notice of the bus 18 (S11). The bus master then determines whether a response (first response) indicating that the use notice of the bus 18 is accepted has been received from the coordination circuit 22 or not (S12).

When the first response has not been received (S12 No), the bus master proceeds to S12. That is, the bus master waits until the first response is received.

When the first response has been received (S12 Yes), the bus master requests the arbitration circuit 21 of the bus arbiter 19 to assign the use right of the bus 18 (S13). The bus master then determines whether a response (second response) indicating that use of the bus 18 is permitted has been received from the arbitration circuit 21 or not (S14).

When the second response has not been received (S14 No), the bus master proceeds to S14. That is, the bus master waits until the second response is received. When the second response has been received (S14 Yes), the bus master transmits an address and a burst length to the bus 18 (S15). The transmitted address and burst length are received by the slave.

The bus master then performs data transfer via the bus 18 (S16). The data transfer is data transfer from the bus master to the slave, or data transfer from the slave to the bus master. Upon completion of the data transfer, the bus master notifies the coordination circuit 22 that the data transfer is completed (S17), and ends the data transfer control process (End).

According to the data transfer control process described above, the bus master can perform data transfer via the bus 18 to or from the slave.

Figure 9:
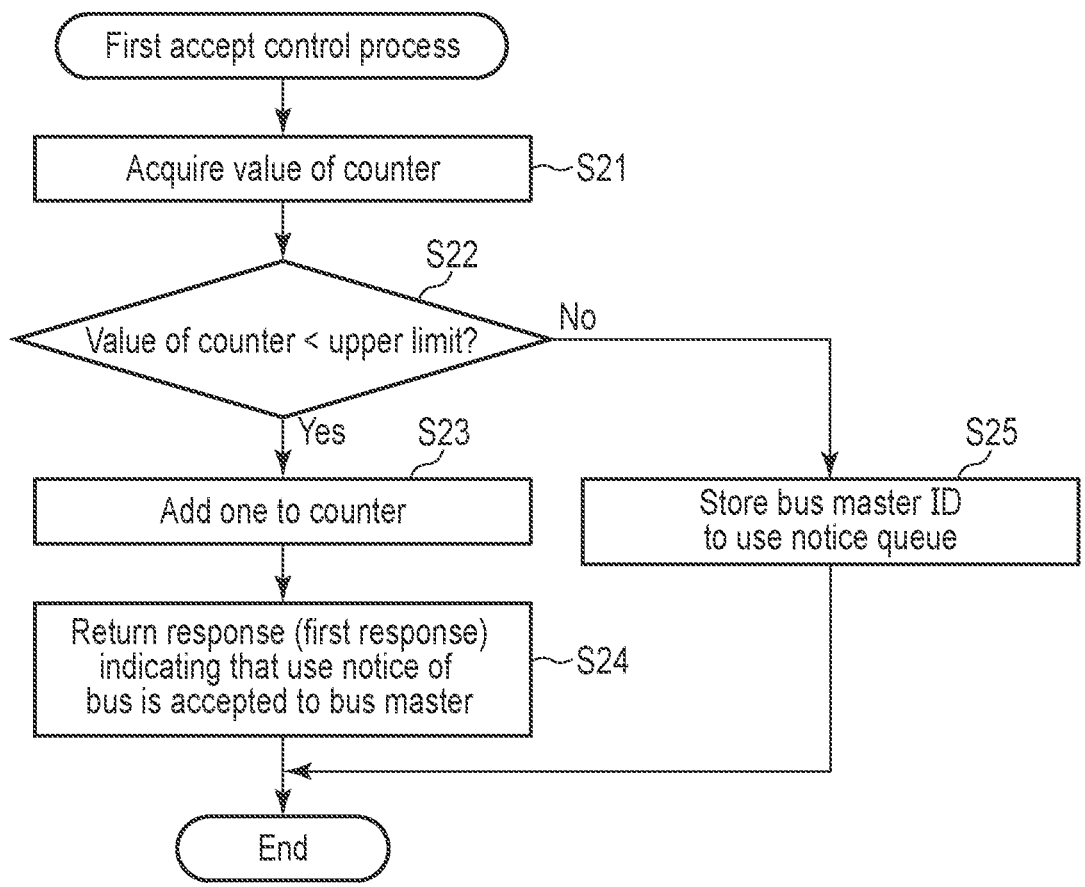
FIG. 9 is a flowchart illustrating an example of the procedure of a first acceptance control process performed in a coordination circuit of the semiconductor storage device according to the embodiment.

FIG. 9 is a flowchart illustrating an example of the procedure of a first acceptance control process performed in the coordination circuit 22 of the semiconductor storage device 3 according to the embodiment. Upon receiving a use notice of the bus 18 from a bus master, the coordination circuit 22 performs the first acceptance control process.

First, the coordination circuit 22 acquires the value of the counter 41 (S21). The coordination circuit 22 determines whether the acquired value of the counter 41 is smaller than the upper limit or not (S22).

When the acquired value of the counter 41 is smaller than the upper limit (S22 Yes), the coordination circuit 22 adds one to the counter 41 (S23). The coordination circuit 22 then returns a response (first response) indicating that the use notice of the bus 18 is accepted, to the bus master (S24), and ends the first acceptance control process (End).

When the acquired value of the counter 41 is equal to or larger than the upper limit (S22 No), the coordination circuit 22 stores the ID of the bus master (bus master ID) to the use notice queue 42 (S25), and ends the first acceptance control process (End).

Specifically, the coordination circuit 22 writes the bus master ID into a slot of the use notice queue 42 that is indicated by the tail pointer 42T. The coordination circuit 22 then adds one to the tail pointer 42T.

According to the first acceptance control process described above, the coordination circuit 22 returns the first response to the bus master when the value of the counter 41 is smaller than the upper limit. When the value of the counter 41 is equal to or larger than the upper limit, the coordination circuit 22 stores the bus master ID to the use notice queue 42. That is, the coordination circuit 22 accepts the use notice of the bus 18 so that the number of bus masters that are using the bus 18 is the upper limit or less. This prevents the data transfer rate between the bus master and the slave via the bus 18 from becoming slow because of the bandwidth of the bus 18 that is a bottleneck.

FIG. 10 is a flowchart illustrating an example of the procedure of a second acceptance control process performed in the coordination circuit 22 of the semiconductor storage device 3 according to the embodiment. Upon storing the bus master ID to the use notice queue 42, the coordination circuit 22 performs the second acceptance control process.

First, the coordination circuit 22 acquires the value of the counter 41 (S31). The coordination circuit 22 determines whether the acquired value of the counter 41 is smaller than the upper limit or not (S32). When the acquired value of the counter 41 is equal to or larger than the upper limit (S32 No), the coordination circuit 22 proceeds to S31. That is, the coordination circuit 22 repeats the procedures S31 and S32, until the acquired value of the counter 41 falls below the upper limit.

When the acquired value of the counter 41 is smaller than the upper limit (S32 Yes), the coordination circuit 22 acquires the heading bus master ID from the use notice queue 42 (S33). The slot of the use notice queue 42 in which the heading bus master ID is stored is indicated by the head pointer 42H. Specifically, the coordination circuit 22 reads the bus master ID from the slot of the use notice queue 42 that is indicated by the head pointer 42H. The coordination circuit 22 then adds one to the head pointer 42H.

Next, the coordination circuit 22 adds one to the counter 41 (S34). The coordination circuit 22 returns a response (first response) indicating that the use notice of the bus 18 is accepted, to a bus master that corresponds to the acquired bus master ID (S35). The coordination circuit 22 then determines whether there is a bus master ID stored in the use notice queue 42 (S36). More specifically, the coordination circuit 22 determines that there is a bus master ID stored in the use notice queue 42 when the head pointer 42H and the tail pointer 42T indicate different slots.

When there is a bus master ID stored in the use notice queue 42 (S36 Yes), the coordination circuit 22 proceeds to S31. That is, the coordination circuit 22 continues the process of controlling acceptance of the use notice that corresponds to the bus master ID stored in the use notice queue 42.

When there is no bus master ID stored in the use notice queue 42 (S36 No), the coordination circuit 22 ends the second acceptance control process (End), since there is no use notice for which the first response has not been returned to the bus master.

According to the second acceptance control process described above, the coordination circuit 22 returns the first response to the bus master that corresponds to the stored bus master ID if the value of counter 41 falls below the upper limit while the bus master ID is stored in the use notice queue 42. That is, the coordination circuit 22 accepts the use notice of the bus 18 so that the number of bus masters that are using the bus 18 is the upper limit or less. This prevents the data transfer rate between the bus master and the slave via the bus 18 from becoming slow because of the bandwidth of the bus 18 that is a bottleneck.

Figure 11:
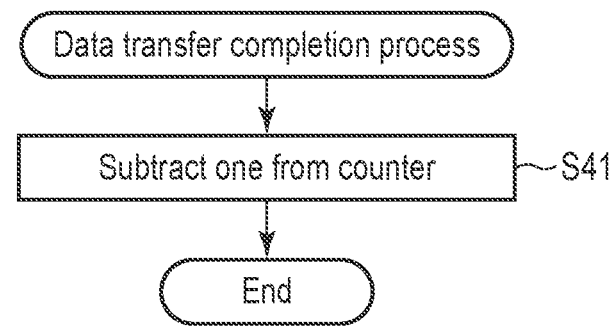
FIG. 11 is a flowchart illustrating an example of the procedure of a data transfer completion process performed in the coordination circuit of the semiconductor storage device according to the embodiment.

FIG. 11 is a flowchart illustrating an example of the procedure of a data transfer completion process that is performed in the coordination circuit 22 of the semiconductor storage device 3 according to the embodiment. The coordination circuit 22 performs the data transfer completion process when completion of data transfer has been notified of by a bus master. The coordination circuit 22 may perform the first acceptance control process, the second acceptance control process, and the data transfer completion process in parallel.

Specifically, the coordination circuit 22 subtracts one from the counter 41 (S41), and ends the data transfer completion process (End). This may vary results of determination on whether the value of the counter 41 is smaller than the upper limit or not in S22 of the first acceptance control process and in S32 of the second acceptance control process.

Figure 12:
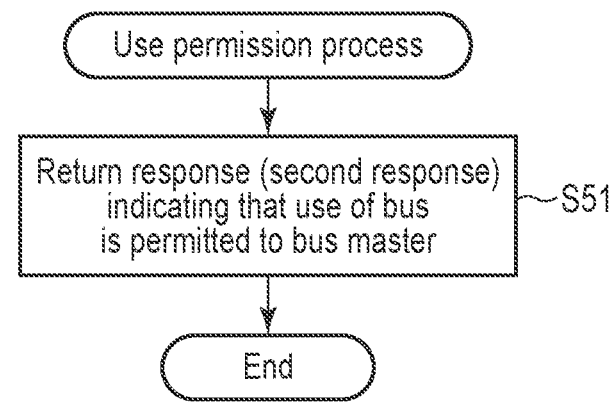
FIG. 12 is a flowchart illustrating an example of the procedure of a use permission process performed in an arbiter circuit of the semiconductor storage device according to the embodiment.

FIG. 12 is a flowchart illustrating an example of the procedure of a use permission process that is performed in the arbitration circuit 21 of the semiconductor storage device 3 according to the embodiment. The arbitration circuit 21 performs the use permission process when the use right of the bus 18 has been requested by a bus master.

Specifically, the arbitration circuit 21 returns a response (second response) indicating that use of the bus 18 is permitted, to the bus master (S51), and ends the use permission process (End). In accordance with reception of the second response, the bus master can start data transfer via the bus 18 to or from the slave.

As described above, according to the embodiment, the access performance to the nonvolatile memory chips 50 can be improved. Each of the channels 7 is connected to at least one nonvolatile memory chip 50 of the nonvolatile memory chips 50. Each of the nonvolatile memory interfaces 13 is connected to at least one of the channels 7, and controls the at least one nonvolatile memory chip 50 via the connected channel 7. The bus arbiter 19 controls use of the bus 18 in data transfer between the volatile memory 6 and each of the nonvolatile memory chips 50, in accordance with the bandwidth of the bus 18.

This prevents the data transfer rate via the bus 18 from becoming slow because of the bandwidth of the bus 18 that is a bottleneck. In this case, for example, the time required for data transfer from the volatile memory 6 to the nonvolatile memory chip 50 in a data write operation is shortened, as compared with a case where the data transfer rate becomes slow because of the bandwidth of the bus 18 that is a bottleneck. Therefore, the access performance to the nonvolatile memory chips 50 can be improved.

Each of various functions described in the embodiment may be realized by a circuit (e.g., processing circuit). An exemplary processing circuit may be a programmed processor such as a central processing unit (CPU). The processor executes computer programs (instructions) stored in a memory thereby performs the described functions. The processor may be a microprocessor including an electric circuit. An exemplary processing circuit may be a digital signal processor (DSP), an application specific integrated circuit (ASIC), a microcontroller, a controller, or other electric circuit components. The components other than the CPU described according to the embodiment may be realized in a processing circuit.

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. A semiconductor storage device comprising:
a volatile memory;
nonvolatile memory chips;
channels, each of which is connected to at least one nonvolatile memory chip of the nonvolatile memory chips;
nonvolatile memory interfaces, each of which is connected to at least one channel of the channels and controls the at least one nonvolatile memory chip via the connected channel; and
a bus arbiter that controls use of a bus in data transfer between the volatile memory and each of the nonvolatile memory chips in accordance with a bandwidth of the bus, wherein
each of the nonvolatile memory interfaces is a bus master that requests use of the bus,
the bus arbiter controls use of the bus requested by each of the nonvolatile memory interfaces so that a number of bus masters that are using the bus is equal to or less than an upper limit,
a first nonvolatile memory interface of the nonvolatile memory interfaces controls a first nonvolatile memory chip of the nonvolatile memory chips via a first channel of the channels,
the first nonvolatile memory interface notifies the bus arbiter of a first use notice of the bus when data transfer between the volatile memory and the first nonvolatile memory chip is to be performed,
the bus arbiter accepts the first use notice if the number of bus masters that are using the bus is less than the upper limit when the first use notice is notified of, and
the first nonvolatile memory interface performs data transfer between the volatile memory and the first nonvolatile memory chip when the first use notice is accepted.

2. The semiconductor storage device according to claim 1, wherein
the first nonvolatile memory interface notifies the bus arbiter of the first use notice when first data that is stored in the volatile memory is to be written into the first nonvolatile memory chip,
the bus arbiter accepts the first use notice if the number of bus masters that are using the bus is less than the upper limit when the first use notice is notified of, and
the first nonvolatile memory interface performs transfer of the first data from the volatile memory to the first nonvolatile memory chip when the first use notice is accepted.

3. The semiconductor storage device according to claim 2, wherein
a second nonvolatile memory interface of the nonvolatile memory interfaces controls a second nonvolatile memory chip of the nonvolatile memory chips via a second channel of the channels,
the second nonvolatile memory interface notifies the bus arbiter of a second use notice of the bus when second data that is stored in the volatile memory is to be written into the second nonvolatile memory chip,
the bus arbiter:
does not accept the second use notice if the number of bus masters that are using the bus, which include the first nonvolatile memory interface, is equal to or more than the upper limit when the second use notice is notified of; and
accepts the second use notice if transfer of the first data is completed and the number of bus masters that are using the bus becomes less than the upper limit, and
the second nonvolatile memory interface performs transfer of the second data from the volatile memory to the second nonvolatile memory chip when the second use notice is accepted.

4. The semiconductor storage device according to claim 3, wherein
the first nonvolatile memory interface writes the transferred first data into the first nonvolatile memory chip, and
writing of the first data into the first nonvolatile memory chip and transfer of the second data from the volatile memory to the second nonvolatile memory chip are performed in parallel.

5. The semiconductor storage device according to claim 1, wherein
the bus arbiter does not accept the first use notice while the number of bus masters that are using the bus is equal to or more than the upper limit in a case where the first use notice is notified of.

6. The semiconductor storage device according to claim 5, wherein
the bus arbiter comprises a queue,
the queue comprises storage areas each storing identification information of a bus master, and
the bus arbiter:
stores a first identification information of the first nonvolatile memory interface to the queue if the number of bus masters that are using the bus is equal to or more than the upper limit when the first use notice is notified of; and
acquires a second identification information from the queue and accepts a use notice of which is notified by a bus master that corresponds to the second identification information if the number of bus masters that are using the bus becomes less than the upper limit after the first identification information is stored in the queue.

7. The semiconductor storage device according to claim 6, wherein
the bus arbiter accepts, if the second identification information is the first identification information, the first use notice of which is notified by the first nonvolatile memory interface that corresponds to the first identification information.

8. The semiconductor storage device according to claim 1, wherein
the first nonvolatile memory interface requests the bus arbiter to use the bus when the first use notice is accepted,
the bus arbiter permits the first nonvolatile memory interface to use the bus when use of the bus is requested by the first nonvolatile memory interface, and
the first nonvolatile memory interface performs data transfer between the volatile memory and the first nonvolatile memory chip when use of the bus is permitted.

9. The semiconductor storage device according to claim 1, further comprising:
    at least one hardware engine which is a bus master that requests use of the bus, wherein
    the bus arbiter controls use of the bus requested by the at least one hardware engine, and use of the bus requested by each of the nonvolatile memory interfaces so that the number of bus masters that are using the bus is equal to or less than the upper limit.

10. A semiconductor storage device comprising:
    a volatile memory;
    nonvolatile memory chips;
    channels, each of which is connected to at least one nonvolatile memory chip of the nonvolatile memory chips;
    nonvolatile memory interfaces, each of which is connected to at least one channel of the channels and controls the at least one nonvolatile memory chip via the connected channel; and
    a bus arbiter that controls use of a bus in data transfer between the volatile memory and each of the nonvolatile memory chips in accordance with a bandwidth of the bus, wherein
    each of the nonvolatile memory interfaces is a bus master that requests use of the bus,
    the bus arbiter controls use of the bus requested by each of the nonvolatile memory interfaces so that a number of bus masters that are using the bus is equal to or less than an upper limit that is equal to or larger than two, and
    the bus arbiter comprises:
        a counter that counts the number of bus masters that are using the bus; and
        a queue that is capable of storing identification information that corresponds to the bus master.

11. The semiconductor storage device according to claim 10, wherein
    the number of bus masters that are using the bus in parallel is equal to or less than the upper limit.

12. The semiconductor storage device according to claim 10, wherein
    the bus arbiter comprises:
        a first circuit that includes the counter and the queue; and
        a second circuit that permits the bus master to use the bus in accordance with a value of the counter.

13. The semiconductor storage device according to claim 12, wherein
    the bus master transmits a use notice to the first circuit,
    the first circuit transmits, to the bus master, a first response based on the value of the counter,
    the bus master requests the second circuit to assign a use right of the bus after receiving the first response, and
    the second circuit transmits a second response in response to an assignment of the use right requested by the bus master.

14. The semiconductor storage device according to claim 10, wherein
    a first nonvolatile memory interface of the nonvolatile memory interfaces controls a first nonvolatile memory chip of the nonvolatile memory chips via a first channel of the channels,
    the first nonvolatile memory interface notifies the bus arbiter of a first use notice of the bus when data transfer between the volatile memory and the first nonvolatile memory chip is to be performed,
    the bus arbiter accepts the first use notice if the number of bus masters that are using the bus is less than the upper limit when the first use notice is notified of, and
    the first nonvolatile memory interface performs data transfer between the volatile memory and the first nonvolatile memory chip when the first use notice is accepted.

15. A semiconductor storage device comprising:
    a volatile memory;
    nonvolatile memory chips comprising a first nonvolatile memory chip and a second nonvolatile memory chip;
    channels comprising a first channel connected to the first nonvolatile memory chip and a second channel connected to the second nonvolatile memory chip;
    bus masters, each of which requests use of a bus, the bus masters including a first bus master and a second bus muster, wherein the first bus master is connected to the first channel and controls the first nonvolatile memory chip via the first channel, and the second bus master is connected to the second channel and controls the second nonvolatile memory chip via the second channel; and
    a bus arbiter that includes a counter and a queue and controls use of the bus in data transfer between the volatile memory and each of the bus masters so that a number of the bus masters that are using the bus in parallel is equal to or less than a first value that is equal to or larger than two, the counter counting the number of bus masters that are using the bus, the queue being capable of storing identification information that corresponds to each of the bus masters.

16. The semiconductor storage device according to claim 15, wherein
    the first bus master transmits a use notice to the bus arbiter,
    the bus arbiter accepts the use notice when a value of the counter is less than the first value, and
    when receiving, from the bus arbiter, a first response indicating that the use notice has been accepted, the first bus master requests the bus arbiter to assign a use right of the bus.

17. The semiconductor storage device according to claim 15, wherein
    the second bus master transmits a use notice to the bus arbiter, and
    the bus arbiter stores the identification information corresponding to the second bus master to the queue when a value of the counter is equal to or larger than the first value.

18. The semiconductor storage device according to claim 17, wherein
    when the value of the counter has become less than the first value, the bus arbiter transmits a first response to the second bus master, based on the identification information corresponding to the second bus master, the first response indicating that the use notice has been accepted.

19. The semiconductor storage device according to claim 15, wherein
    the first bus master notifies the bus arbiter of a first use notice of the bus when data transfer between the volatile memory and the first nonvolatile memory chip is to be performed,
    the bus arbiter accepts the first use notice if the number of bus masters that are using the bus is less than the upper limit when the first use notice is notified of, and the first bus master performs data transfer between the volatile memory and the first nonvolatile memory chip when the first use notice is accepted.

* * * * *